United States Patent
Ragner

(12) 
(10) Patent No.: US 6,485,169 B1
(45) Date of Patent: Nov. 26, 2002

(54) DEFORMATION-ACTIVATED SAFETY LIGHT FOR ELASTIC TIRES

(76) Inventor: Gary Dean Ragner, 711 SW. 75$^{th}$ St. #103, Gainesville, FL (US) 32607

( * ) Notice: Subject to any disclaimer, the term of this patent is extended or adjusted under 35 U.S.C. 154(b) by 0 days.

(21) Appl. No.: 09/563,771

(22) Filed: May 2, 2000

(51) Int. Cl.$^7$ .............................. B60Q 1/26; H05B 37/02
(52) U.S. Cl. ...................... 362/500; 362/276; 362/464; 362/469; 315/154; 315/159
(58) Field of Search ................... 362/500, 251, 362/802, 276, 464, 469; 315/200 A, 149, 150, 151, 156, 154, 159, 169.3

(56) References Cited

U.S. PATENT DOCUMENTS

| | | | |
|---|---|---|---|
| 4,363,502 A | 12/1982 | Bakerman | 280/816 |
| 4,867,727 A | 9/1989 | Lanius | 446/242 |
| 5,278,732 A | 1/1994 | Frankum | 362/72 |
| 5,294,188 A | 3/1994 | Vancil, Jr. | 301/5.3 |
| 5,475,572 A | 12/1995 | Tseng | 362/78 |
| 5,536,074 A | 7/1996 | Hsu et al. | 301/5.3 |
| 5,580,092 A | 12/1996 | Hsu et al. | 280/809 |
| 5,653,523 A | 8/1997 | Roberts | 362/78 |
| 5,683,164 A | 11/1997 | Chien | 362/78 |
| 5,718,499 A | 2/1998 | De Caro | 362/78 |
| 5,803,574 A | 9/1998 | Szaniszlo | 362/32 |
| 5,864,056 A * | 1/1999 | Bell et al. | 73/146 |
| 6,175,196 B1 * | 1/2001 | Ragner et al. | 315/200 A |

OTHER PUBLICATIONS

U.S patent application Ser. No. 09/346,918, Ragner, filed Jul. 2, 1999.

* cited by examiner

*Primary Examiner*—Sandra O'Shea
*Assistant Examiner*—David V. Hobden

(57) ABSTRACT

The disclosed safety light is designed to provide automatic operation for lights placed on elastic tires. Wheel (100) comprises a hub (84), a urethane tire (88), and a safety light circuit molded into the urethane tire and hub. The safety light circuit is formed on a circuit board which holds electrical components comprising, a battery (B1), deformation-activated switch (SW1), photo sensor and delay (CDS1, D1, R1, R2, Q1, C1), and illumination devices (LED1 and LED2). Battery(B1) provides electromotive power to operate all circuitry, with switch (SW1), photo sensor CDS1, and illumination devices (LEDp1 and LED2) placed substantially in series electrically. Switch (SW1) is designed to conduct current when a change in deformation or a specified rate-of-change in deformation of the tire material is detected. The photocell (CDS1) signals the photo-sensor to conduct current when photocell (CDS1) detects a sufficiently low level of light. When both switch (SW1) and photo sensor are conducting, current will flow to illumination devices(LED1 and LED2) and provide light output. With a time delay on the photo-sensor, continuous light output can be obtained from illumination devices (LED1 and LED2) even though switch (SW1) only provides an intermittent signal. Because deformation switch (SW1) has a predictable point in its rotation (near the rolling surface) where it is activated, it can be used to control the position where photocell (CDS1) takes its reading of the ambient light conditions. Since most in-line skates have a wheel housing that shrouds the upper portion of the wheels, photocell (CDS1) is placed near switch (SW1) so that it samples ambient light while near the ground and away from the wheel housing and skate shoe.

18 Claims, 11 Drawing Sheets

DEFORMATION-ACTIVATED SAFETY LIGHT FOR ELASTIC TIRES

CROSS-REFERENCE TO RELATED APPLICATIONS

Figure 1:
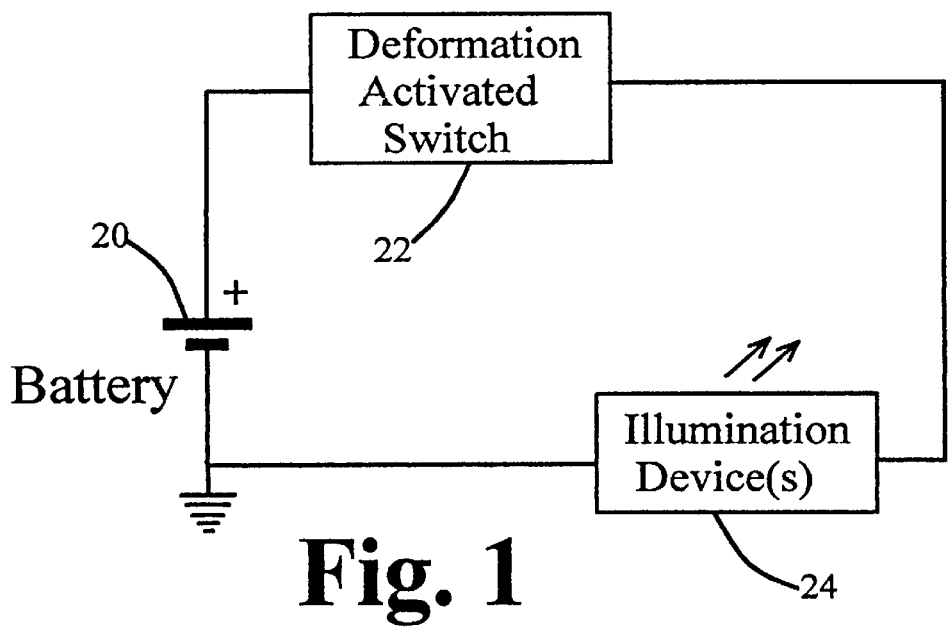

The inventor has another patent pending in the same general area, and give up this later filing date to the filing date of application Ser. No. 09/346,918 under the Terminal Disclaimer Rule 321(b). This is to eliminate any doubt that I believe the invention disclosed here is parentably different to the patent application titled "Photo-Sensitive Illuminated Skate Wheel", application Ser. No. 09/346,918, filed Jul. 2, 1999, now U.S. Pat No. 6,175,196. Tuyet Vo is the Examiner for that application, Group Art Unit 2821.

BACKGROUND

This invention relates to automatic lighting systems and more specifically to automatic lighting systems for wheels and tires.

The invention disclosed here, distinguishes over the above referenced application with six novel features. First, the disclosed circuit uses a switch that is activated by deformation of the elastic tire material itself. This is not found in the above application and is not shown by any other reference. The use of the deformation-activated switch (or deformation-sensing switch) causes the lighting system to operate due to a completely different set of physical stimuli. Prior art uses sensors to detect motion through acceleration of the wheel. The lighting system disclosed here detects the tire's interaction with the ground as it rolls, and is actually insensitive to acceleration in general. For proper operation, substantial contact is needed between the elastic tire and the deformation-sensing switch. In all prior art references this is immaterial for proper operation of the lighting system. Second, the use of a delay circuit to slow activation of the illumination system is no longer needed for this new design. This is because the photo-sensing circuit and the deformation-activated switch are placed in close proximity to one another so that the photocell is near the ground and clear of any shadows caused by the skate shoe or wheel housing when the switch activates the circuit to measure ambient light. Prior art either makes no attempt at addressing this problem or uses delay circuits and averaging circuits to try and determine the actual ambient light. The disclosed invention, because of this, is effective at measuring the actual ambient light level. Third, none of the cited references show an illuminated wheel where the activation of the circuit, and subsequent measuring of the ambient light conditions, only occurs over a small portion of the wheel's rotation. This allows the designer to choose the position of the photocell when detection of light will occur, which in turn allows for optimum operation. Fourth, since the activation of the switch is intermittent, activating once each cycle for a short portion of the wheels rotation, the physical relationship between the switch and photocell is critical. All other prior art use acceleration activated motion sensors which turn on, and remain on, when a wheel is in use. Thus, prior art cannot provide timing for the positioning of the photo sensor so that it properly samples the ambient light conditions. With the disclosed invention the placement of the photocell near the activation switch is very important for proper operation, prior art does not even address such a need. Fifth, the photo sensor does not need a circuit to average the ambient light detected by the photo sensor as in application Ser. No. 09/346,918. It is not needed since the disclosed deformation switch allows sampling to take place only when the photocell is near the ground and unobstructed by the skate shoe and housing. Thus, the "actual" ambient light level can be sampled and "stored" for the remainder of the wheel's revolution. Sixth, the disclosed invention allows precisely timed intermittent illumination of the circuit. The use of a switch that activates upon the deformation of the tire as it contacts the ground allows the activation of the illumination device during a specific portion of the wheel rotation. With this control the illumination device can be made to turn "ON" only during the portion of its rotation while it is clear of the skate wheel assembly (i.e. the wheel support channel on a roller blade skate), so that light output is used more efficiently. All prior art either activates continuously, or oscillates randomly with respect to the wheel's rotation.

DESCRIPTION OF PRIOR ART

The use of lights on rotating assemblies, such as, bicycle and roller skate wheel is well known. Most systems for illuminating wheels and toys involve a battery, a manual switch, and an illumination device connected in series. The only problem with these designs is that they must be turned on by the user and also turned off. Since the most likely user of such devices are children, it is unlikely that such a system will be used properly. Either the light is not turned on at dusk or when they are turned-on, the light is not turned-off, thus draining the battery, making it unworkable to permanently seal the circuit within the elastic material.

To get around these problem a number of inventions have been designed which use the rotating motion of the wheel or toy to generate electricity to power the lights. In this way there are no external switches to turn on and off and no batteries to change. An examples of such a generator powered wheel is shown in U.S. Pat. No. 5,718,499 to Caro for a "Roller Blade Wheel Lighting System". However, these systems are complicated, heavy, expensive to build, and are prone to failure under the harsh environment kids place them in. They also create a constant drag on the wheels which is undesirable. These systems also require specially designed skate shoes and attachments which adds to cost. The invention disclosed here does not suffer from these problems and can be used with standard roller skates wheels, standard motor vehicle tires, etc. And because the electronic circuit can be completely sealed inside a polymer or urethane tire, with no moving parts, and no external switches, its reliability is far superior to any of the generator powered designs.

Another way inventors have tried to eliminate the use of external switches is to include an acceleration sensor (i.e. motion sensor, acceleration switch, accelerometer, etc.). By including such a circuit, battery power is conserved because the device only lights when moved at sufficiently high accelerations. The use of acceleration sensors are shown in U.S. Pat. No. 5,683,164 to Chien for an "Illuminated Wheel", U.S. Pat. No. 5,580,092 to Hsu et al. for a "Roller Skate Wheel with Light Producing Means", U.S. Pat. No. 5,536,074 to Hsu for a "Light-Generating Wheel for an In-line Skate", U.S. Pat. No. 5,475,572 to Tseng for a "Light Emitting Roller for Roller Skates", U.S. Pat. No. 5,294,188 to Vancil for an "Illuminated Roller Skate Wheel", and U.S. Pat. No. 4,363,502 to Rakerman for an "Illuminative Skate Wheel". More advanced designs include circuit delays such as that shown in U.S. Pat. No. 5,653,523 to Roberts for a "Miniature Centrifugal Lighting Assembly". In this last design uses a delay circuit to keep the lights on for a short time after motion has stopped. This allow the lights to continue operating even if the user pauses for a moment to rest, but shuts off after a predetermined time period. These designs are all workable systems, but still waste a great deal of battery power during the daytime when the lights are not really needed.

U.S. patent No. 5,803,574 to Szaniszlo shows a safety light for bicycle wheels which uses an acceleration switch and photo sensor to control activation only when sufficiently dark out. The acceleration switch however is unstable and produces different outputs depending on the wheel's speed of rotation. Because of this instability, a delay circuit is needed to latch the acceleration switch's contact when it occurs. However, their is no specific point in the rotation that the acceleration switch is activated, thus, the activation point can not be controlled. The disclosed invention keep very precise control over when the circuit is activated and does not depend on the rotation speed of the wheel. Thus, timing can be precisely controlled to place the photocell far away from obstructions that might cause a false reading of ambient light levels (i.e. when a wheel is partially shrouded). This is something Szaniszlo's design can not do. The disclose invention provides this control by using a deformation-activated sensor which reacts to totally different physical stimuli than an acceleration switch. An acceleration switch requires rotation or vibration of the wheel for activation, while the deformation switch activates from pressure placed on the tire portion of the wheel. Thus, the disclosed invention is immune to jarring and vibration that occurs during shipment. This eliminates the need for an enabling switch that Szaniszlo's design requires, to prevent draining the battery during shipping and handling. Szaniszlo teaches only the installation of his device on bicycle wheels. While his device could be used other places it would require extensive modifications to be placed within a in-line roller blade wheel and a motor vehicle tire sidewall.

The disclosed invention does not suffer from the above limitations. An automatic deformation-activated switch limits power usage to only times when rolling on a surface, and a photo sensor allows power drain only during times of low ambient light. This combination saves battery power and results in battery use that is over four times less that Roberts centrifugal light design. Even more energy can be saved by not using a delay circuit which results in short bursts of light when the deformation-activated switch is activated each revolution of the tire. Because the battery is easily the most costly part of the entire circuit, the use of a smaller battery can save money and space in the design. In fact, the proposed safety light saves so much power, the circuit can be completely sealed inside a housing and the battery(ies) never need to be changed for the life of the wheel or tire. An in-line roller skate wheel lasts 50 to 200 hours depending on the surface which it is used. If we assume that less than 25 percent of the time it will be used in the dark, an operational battery life of approximately 30 to 50 hours should be sufficient to last the life of the wheel. For an in-line skate wheel this battery life can be achieved by the disclose invention with a single lithium button battery. Without the photo sensor circuit and automatic pressure switch, a roller blade or roller skate wheel would run out of power before the wheel was completely used, or would require a much larger battery(ies), or operate at much lower power which reduces visibility. This is a safety hazard for children since they will in general use the wheel until it is completely wore out. The addition of a photo sensor adds very little to the cost of the circuit, and more than pays for itself by reducing the size of the battery and allowing operation of the wheel during the day without draining the battery.

If a delay circuit is not used in the disclosed invention, the light output will be in short bursts as the deformation-activated switch is pressed. This further extends the life of the battery. Each illumination device may be activated for less than 25% of the wheel's rotation. Since the activation position can be controlled, all the light output can be emitted so that it is seen, that is, no light is wasted illuminating the inside of a wheel channel or fender. Thus, the circuit can use four times less power or provide illumination that is 4 times brighter than even the Applicants prior art U.S. Pat. No. 6,175,196 "Photo-Sensitive Illuminated Skate Wheel".

This circuit if mounted in the side walls of car and motorcycle tire would provide good side visibility at night. The placement in motor vehicle tires (cars, motorcycle, 3-wheelers, etc.) could be especially important for motorcycles which are most likely not to be seen at night. By placing a deformation-activated switch in the side-wall of the tire, the circuit can be activated by the change in bending(deformation) of side-wall caused by compression of the tire against the pavement. A modem automotive tire lasts about 50,000 miles. If we assume an average speed of 50 miles per hour this means the tire will last approximately 1,000 hours. If one quarter of this driving occurs at night then only 250 hours of battery life is needed for the lighting system to last the life of the tire. Using a single lithium AA sized battery, such a safety light circuit will provide well over 250 hours of battery life and could even last 1000 hours depending on how the circuit is designed.

The invention disclosed here is especially designed for operation within in-line skate wheels, and motor vehicle tires (car, motorcycle, etc.), though it may also be used in roller skate wheels and other wheels which are constructed of elastic tire materials that are deformed during use. For these types of wheels, the periodic deformation of the wheels as they rotates against the ground can be detected by a properly placed pressure switch, so that the deformation of the elastic tire is detected. This deformation is used to activate a pressure switch which turns on the lighting system to provide a flashing or rotating pattern depending on the circuit's design. The flashing or rotating pattern easily catches ones eye. The rotating pattern provides easily identified as a rolling vehicle even when no other part of the vehicle can be seen. If the circuit is place in a ball, the deformation of the ball material when bounced against a surface is detected by a pressure switch which activates due to this deformation.

OBJECTIVES AND ADVANTAGES

Accordingly, several objects and advantages of this invention are:

a) To use of a deformation-activated switch to eliminates accidental activation due to vibration during transport. The deformation-activated switch is only activated when the wheel is in use and rolling on a surface with pressure.

b) To provide a safety light which allows brighter operation for a given battery size and operational life by reducing actual "ON" time to only times when: 1) the deformation of the wheel's tire is detected, and 2) low ambient light is detected.

c) To provide a safety light for a tire which can reliably be activated over a specific arc section in its rotation, while remaining "off" during the remainder of the wheel's revolution.

d) To provide a safety light for a tire, which can: 1) be reliably activated over a specific arc section in its rotation while remaining "off" during the remainder of the wheel's rotation, and 2) be activated only when the safety light detects a substantially dark environment.

e) To provide a safety light which allows brighter operation for a given battery size and operational life by reducing actual "ON" time to only times when: 1) the deformation of the wheel's tire is detected, 2) a photocell detects low ambient light levels, and 3) over a specific arc section of rotation so the illumination device is not hidden behind any obstructions while illuminated.

f) To provide ambient light sensing when the deformation-activated switch is activated, which allows the photosensor photocell to be at a known position in its rotation when activated. This allows the photo sensor to activate when it is not obstructed by a wheel support or shroud. Thus, the Safety Light circuit can easily detect the true ambient light level.

g) To provide a safety light for a tire, which can: 1) be activated only when the safety light detects a substantially dark environment and 2) activate and remain "on" for a specified time after the deformation sensor detects deformation of the tire. Thus, the illumination of the system has a delay that keeps it "on" for a short time after the deformation sensor no longer detects deformation of the tire.

h) To provide detection of rate of-change in deformation of an elastic tire for sending an "ON" signal that a wheel or tire is rolling on a surface. This mode of detection is especially important for automotive tires where the vehicle's weight is always present that can deform the tire. Thus, by detecting the rate-of-change in deformation, instead of a specific amount of deformation, an automotive tire can be park on the deformation-sensing switch side of the tire without causing the deformation switch to stay activated.

i) To provide a safety light for a tire, which can: 1) be activated only when the safety light detects a substantially dark environment and 2) be activate only while a significantly high rate-of-change in deformation of the tire is detected. Thus, the illumination of the system is active only in the dark and while the deformation sensor detects a significantly high rate-of-change in deformation of the tire.

j) To provide a safety light for a tire, which can: 1) be activated only when the safety light detects a substantially dark environment and 2) be activate and remain "on" for a specified time by the deformation sensor detecting a significantly high rate-of-change in deformation of the tire. Thus, the illumination of the system has a delay that keeps it "on" for a short time after the deformation sensor no longer detects the high rate-of-change in deformation of the tire.

k) To provide a safety light compact enough to fit within an in-line roller skate wheel, and illuminating the wheel only when used in the dark.

l) To provide a means for using a much smaller battery than would normally be possible, where substantial reductions in power consumption is achieved by limiting activation of the safety light to only times when the wheel is in use and also in a dark environment.

m) To provide a safety light for wheels that is highly reliable, and automatically activating when needed.

n) To provide a safety light compact enough to fit in within the side-wall of a motor vehicle wheel to provide side lighting when in use, and able to detect deformation of the tire sidewall.

o) To eliminate external switches and eliminate the need to change batteries, whereby the Safety Light can be completely sealed within its housing to provide a water-tight and airtight enclosure.

p) To provide a circuit that can withstand the injection molding process of molding the tire section around it. Insulation is used to help protect sensitive components from the heat.

q) To provide focused LED light from the sides of the wheel so that people viewing from the side of the wheel will see vary bright light output.

r) To provide an automatic battery-powered lighting systems for wheels where the battery lasts the life of the device.

s) To use Light Emitting Diodes (LEDs) to provide efficient light production to further extending battery life.

t) To provide the combination of high efficiency LEDs and Lithium battery which makes a very compact lighting system with an exceptionally long operational life.

u) To provide a delayed turn-off of safety light illumination when deformation of the tire is no longer detected, thus providing safety illumination even when the user momentarily stops.

v) To provide a saftey light circuit for tires that detects the state-change of a deformation-sensing switch. When the switch changes state (conductive to nonconductive, or nonconductive to conductive) due to deformation of an elastic tire, and is in a dark environment, the circuit is activated to provide illumination. This mode of detection is especially important for automotive tires where the vehicle's weight is always present to deform the tire. Thus, by using the switching of the switch, instead of the state of the switch, an automotive tire can be park on the deformation-sensing switch side of the tire without causing the deformation switch to stay activated.

w) To provide a safety light for a tire, which can: 1) be activated only when the safety light detects a substantially dark environment and 2) be activate only for a predetermined amount of time after a deformation-sensing switch changes state. Thus, the illumination of the system is active only in the dark and for a time after the deformation sensing switch changes state.

x) To provide a safety light for a tire, which can: 1) be activated only when the safety light detects a substantially dark environment and 2) be activate by a deformation-sensing switch and 3) after being activated slowly shutoff independent of the final state of the switch.

DRAWING FIGURES

FIG. 1 Safety Light Circuit Diagram.

Figure 2:
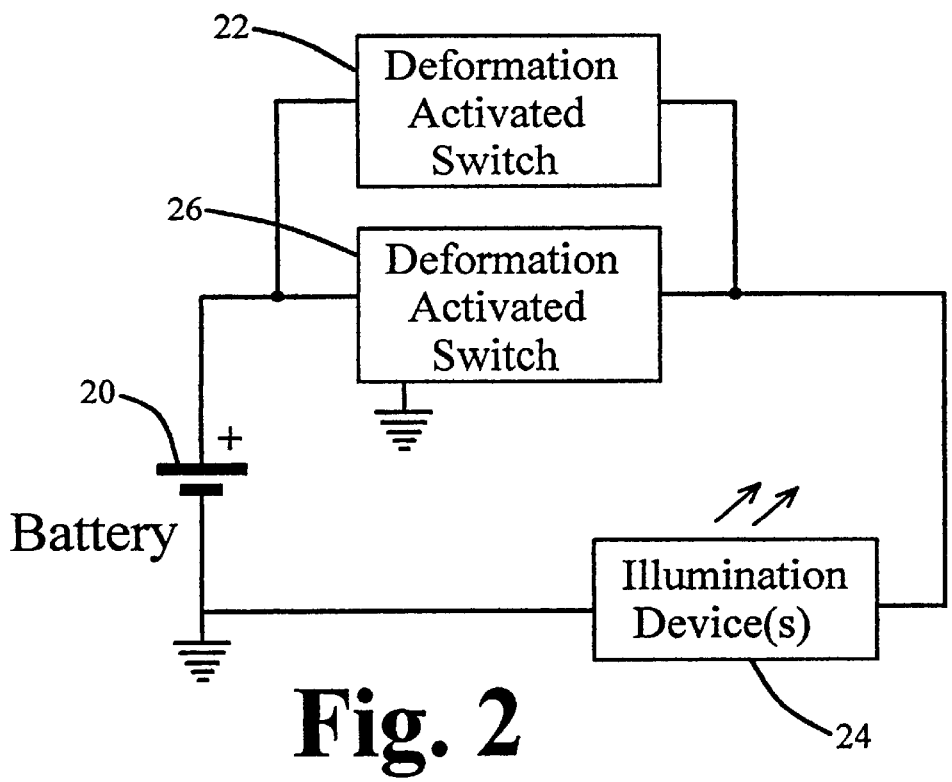

FIG. 2 Alternate Safety Light Circuit Diagram.

Figure 3:
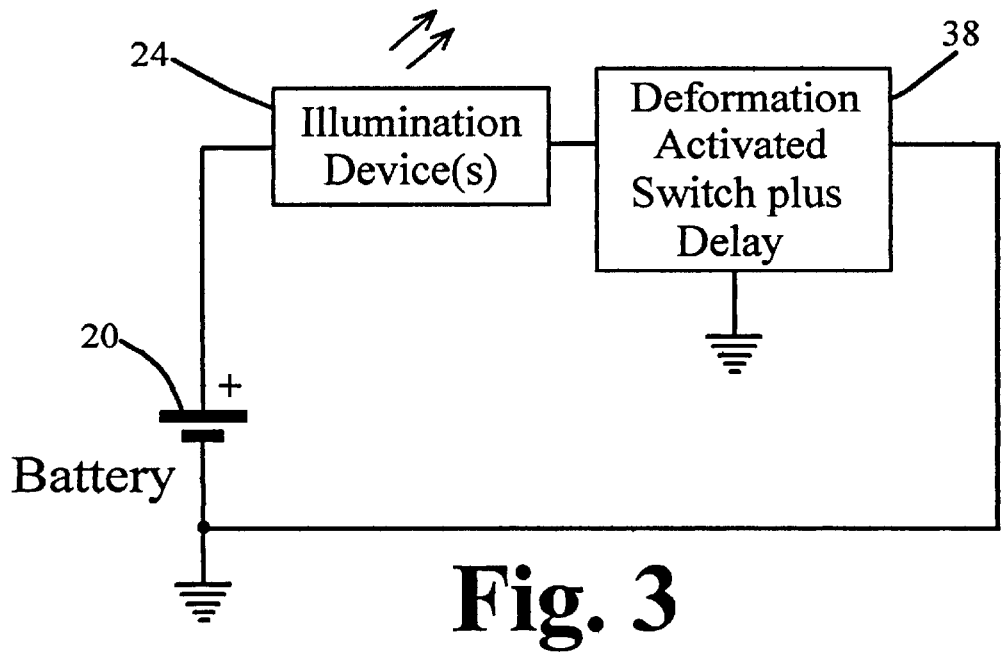

FIG. 3 Alternate Safety Light Circuit Diagram.

Figure 4:
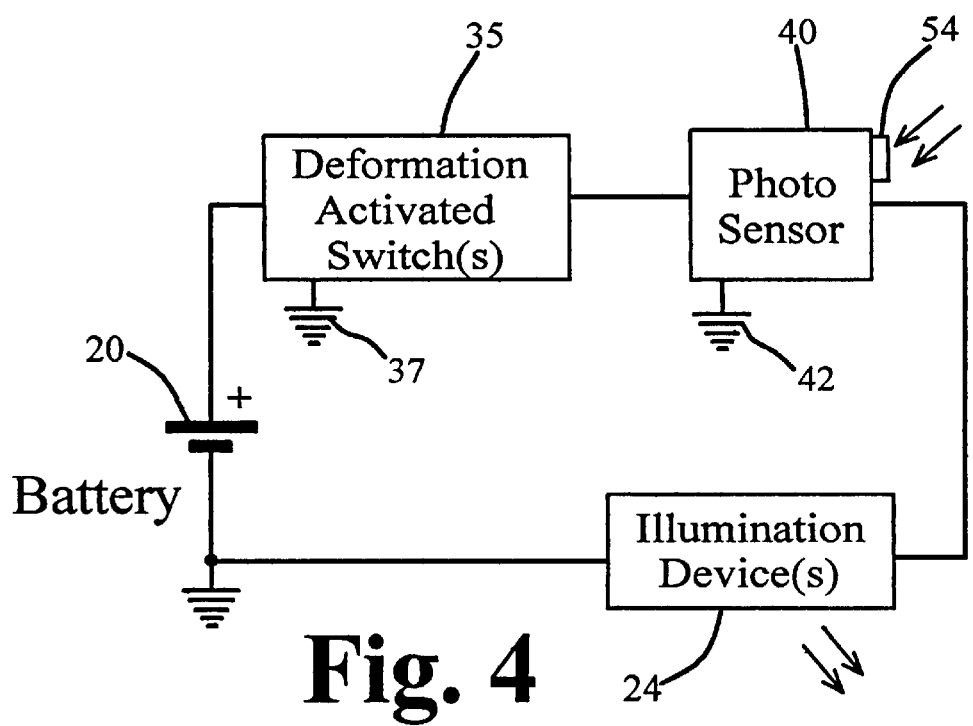

FIG. 4 Block Diagram of Safety Light Circuit with photo-sensor.

Figure 5:
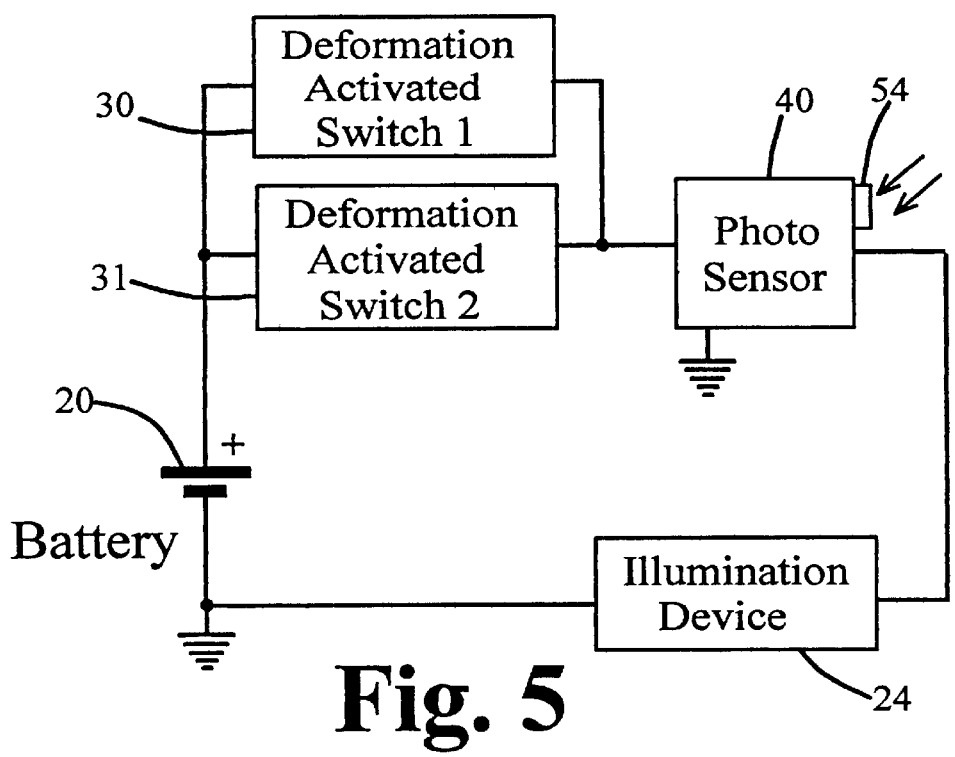

FIG. 5 Alternative Circuit diagram with photo-sensor.

Figure 6:
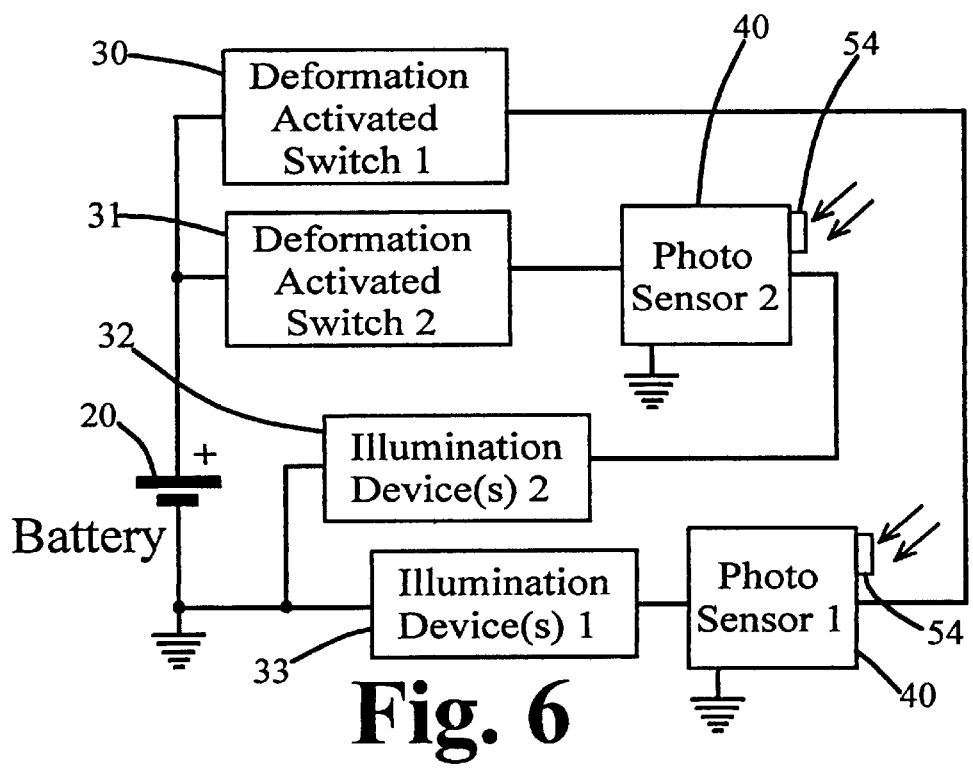

FIG. 6 Alternative Circuit diagram with two photo-sensor.

Figure 7:
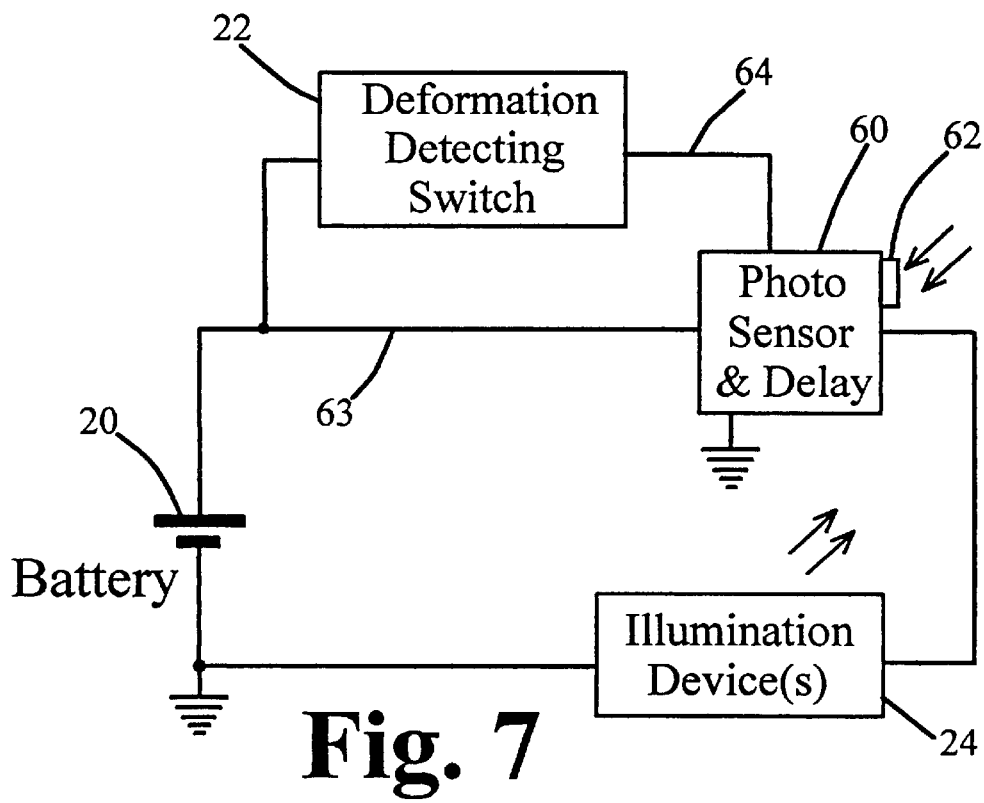

FIG. 7 Alternative Circuit diagram with photo-sensor delay.

Figure 8:
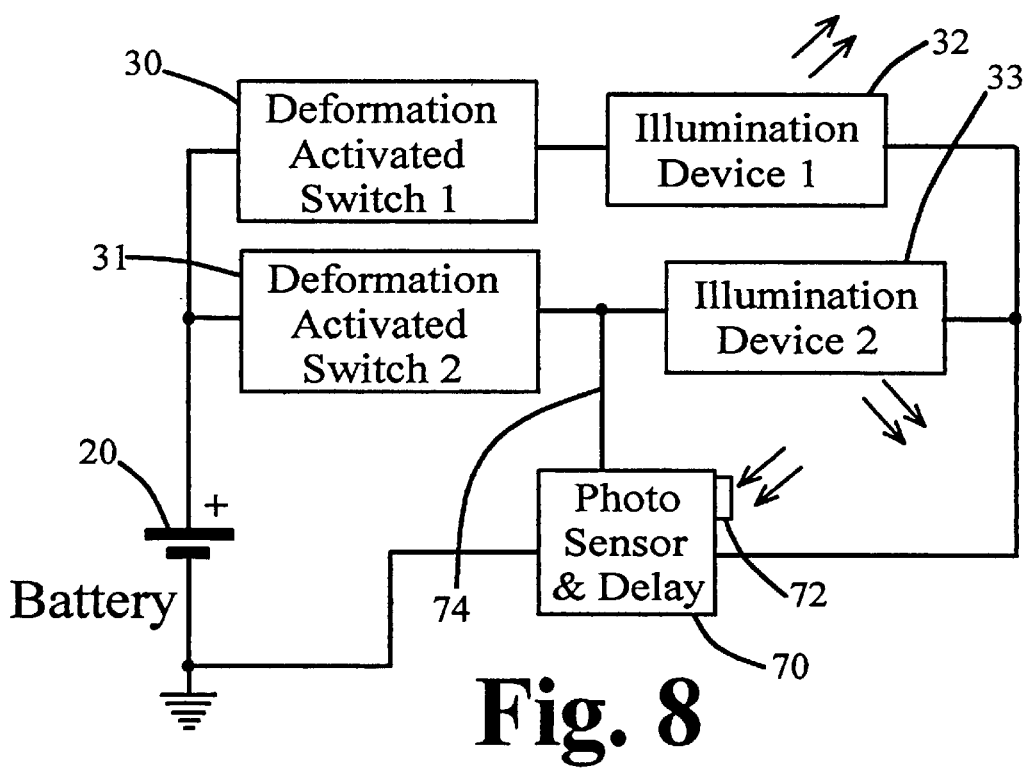

FIG. 8 Preferred Circuit diagram with photo-sensor delay.

Figure 9:
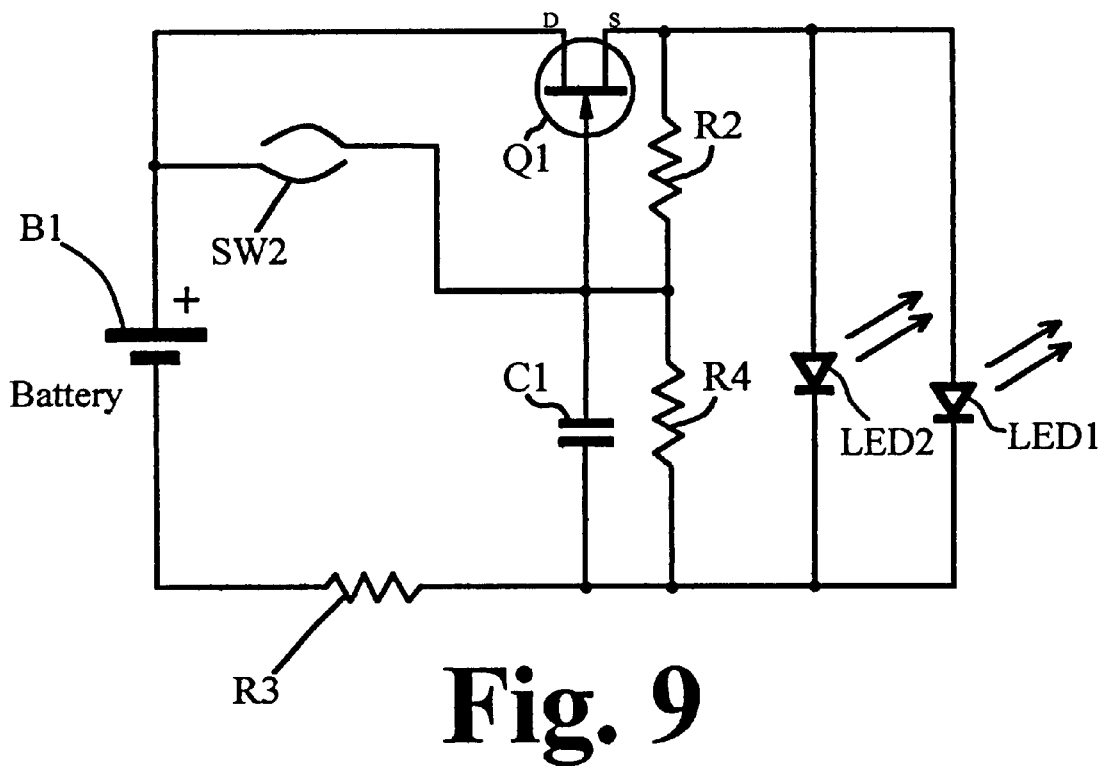

FIG. 9 Simple circuit Schematic (no photo-sensor)

Figure 10:
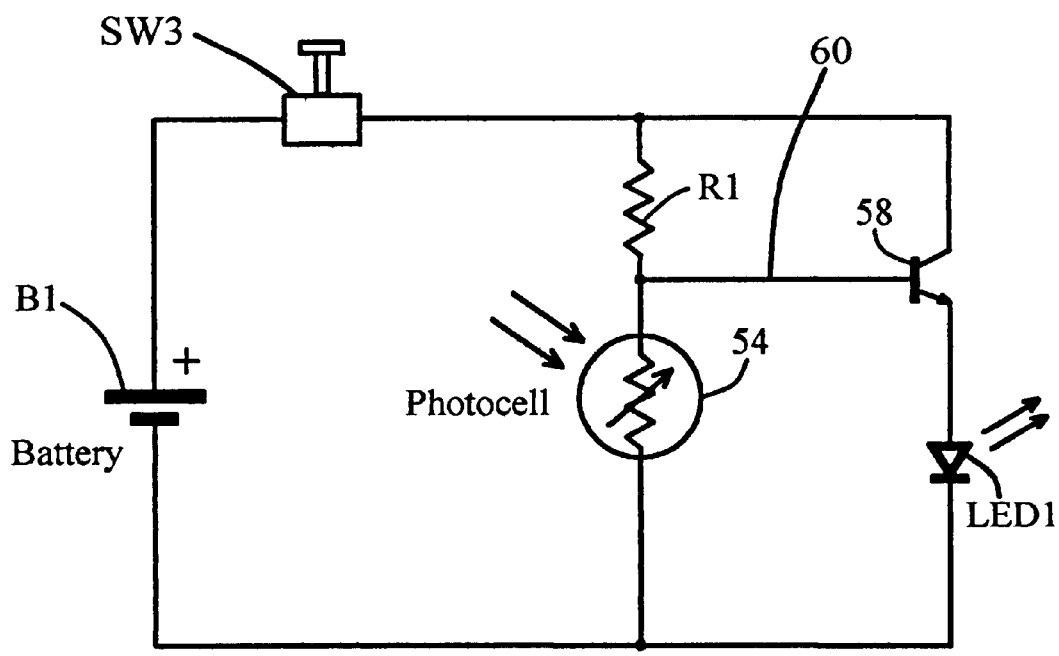

FIG. 10 One possible Circuit schematic for FIG. 4 diagram

Figure 11:
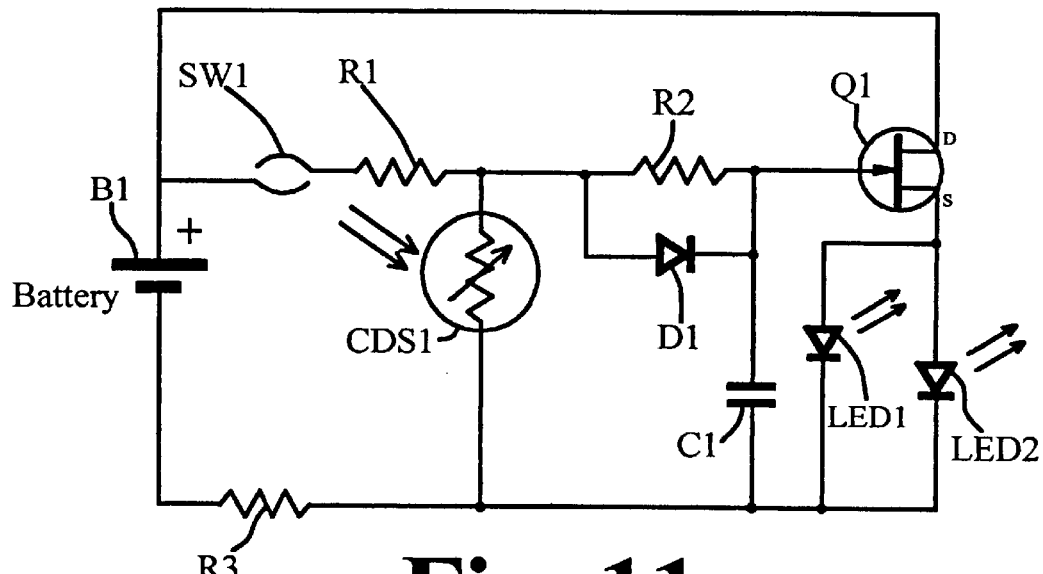

FIG. 11 One possible Circuit schematic for FIG. 7 diagram

Figure 12:
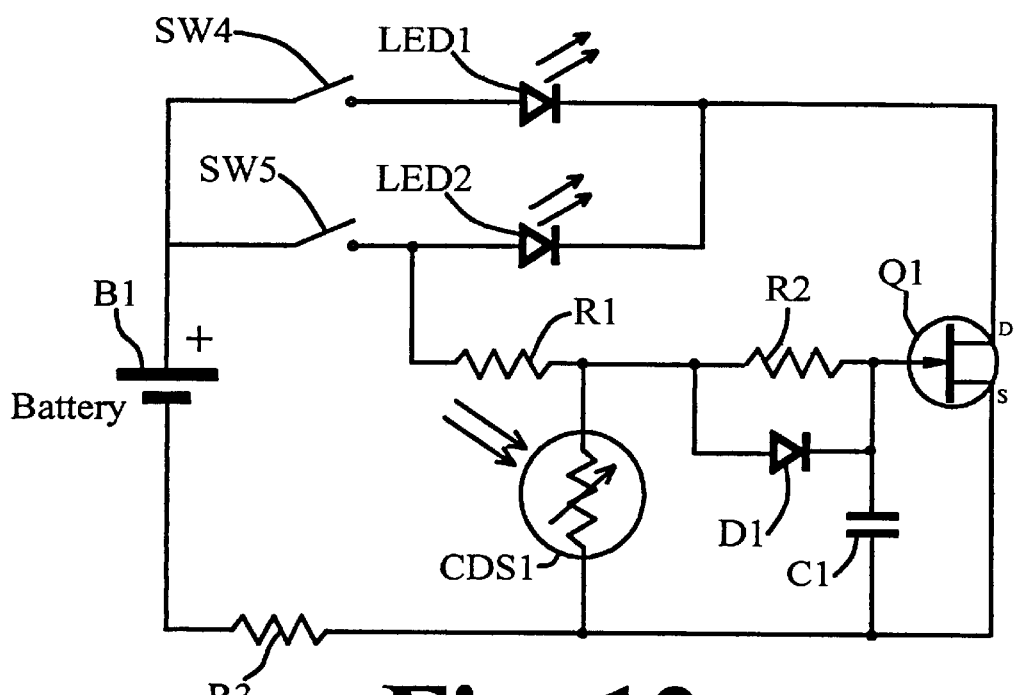

FIG. 12 One possible Circuit schematic for FIG. 8 diagram

Figure 13:
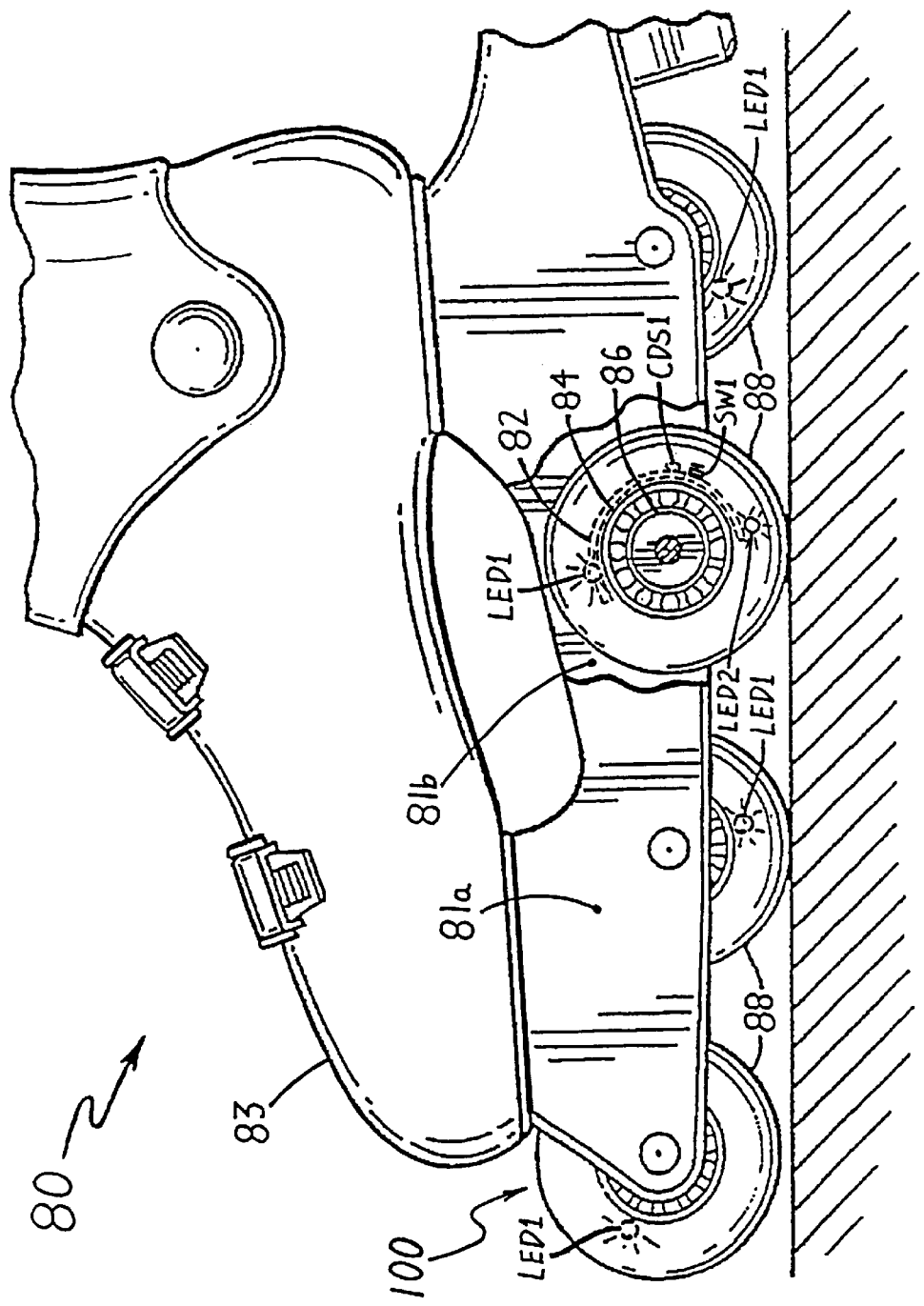

FIG. 13 In-Line Roller Skate with Safety Light Wheels.

Figure 14:
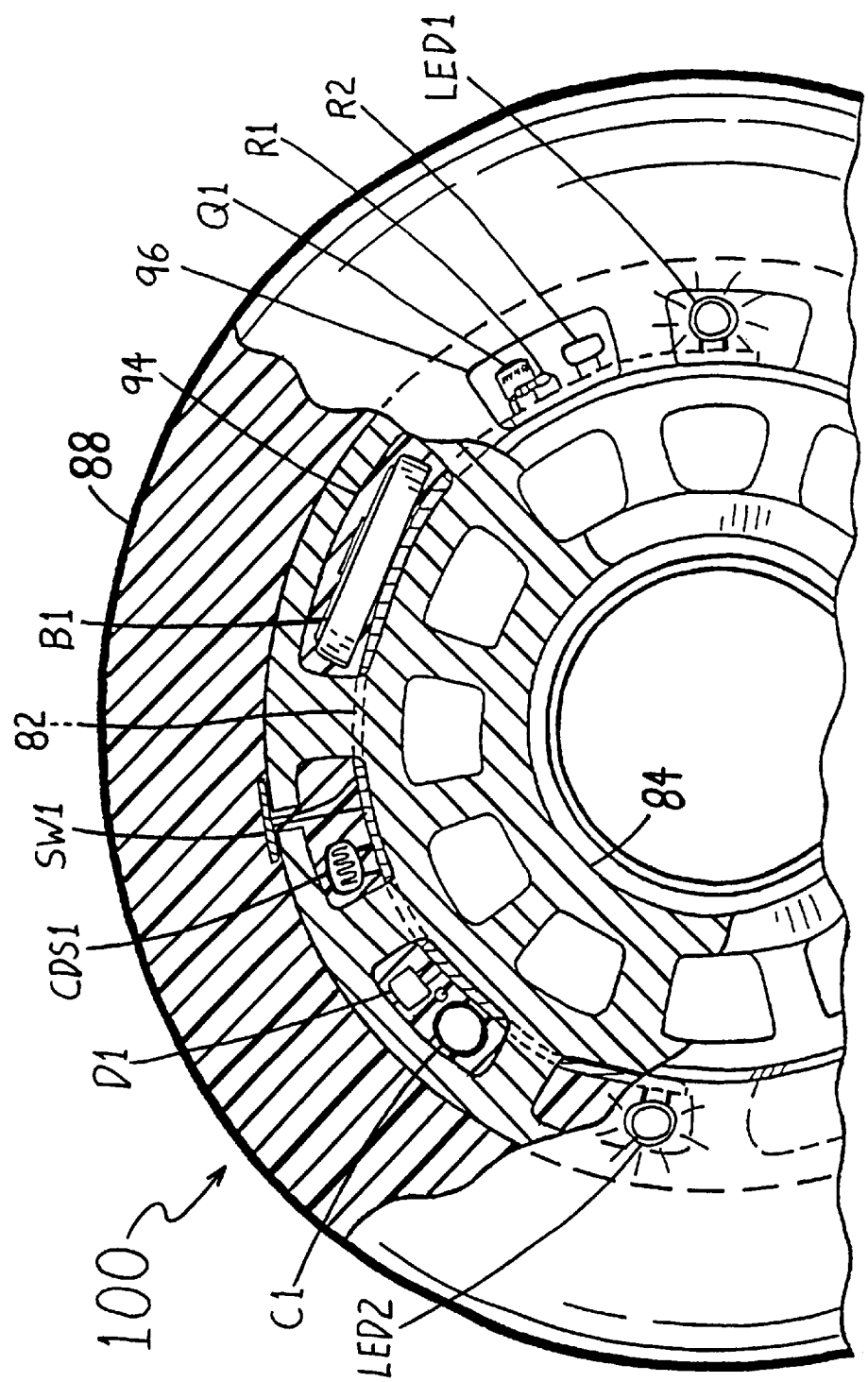

FIG. 14 In-Line Roller Skate Wheels with Pressure Pad Switch.

Figure 15:
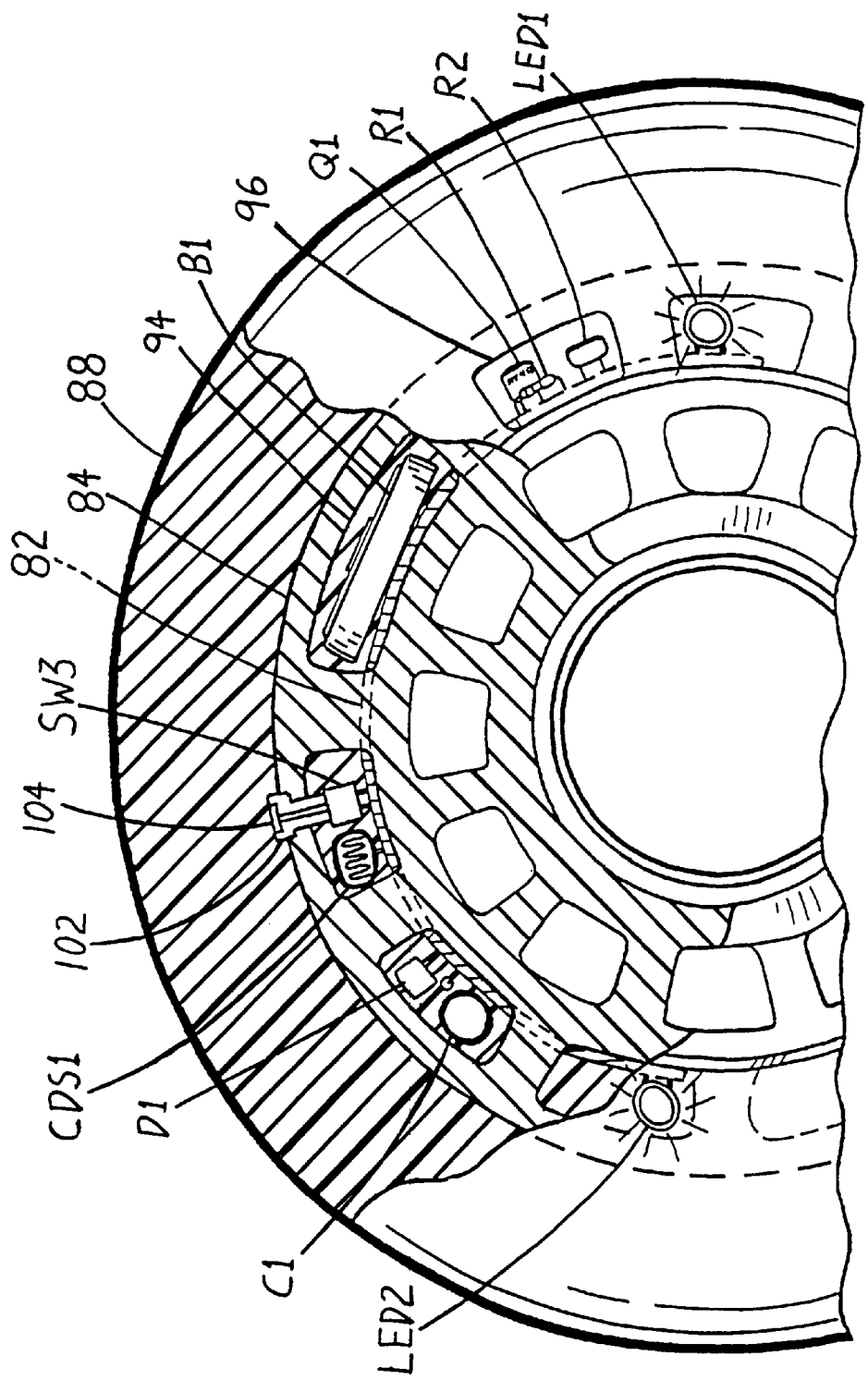

FIG. 15 In-Line Roller Skate Wheels with Push Button Switch.

Figures 16, 17:
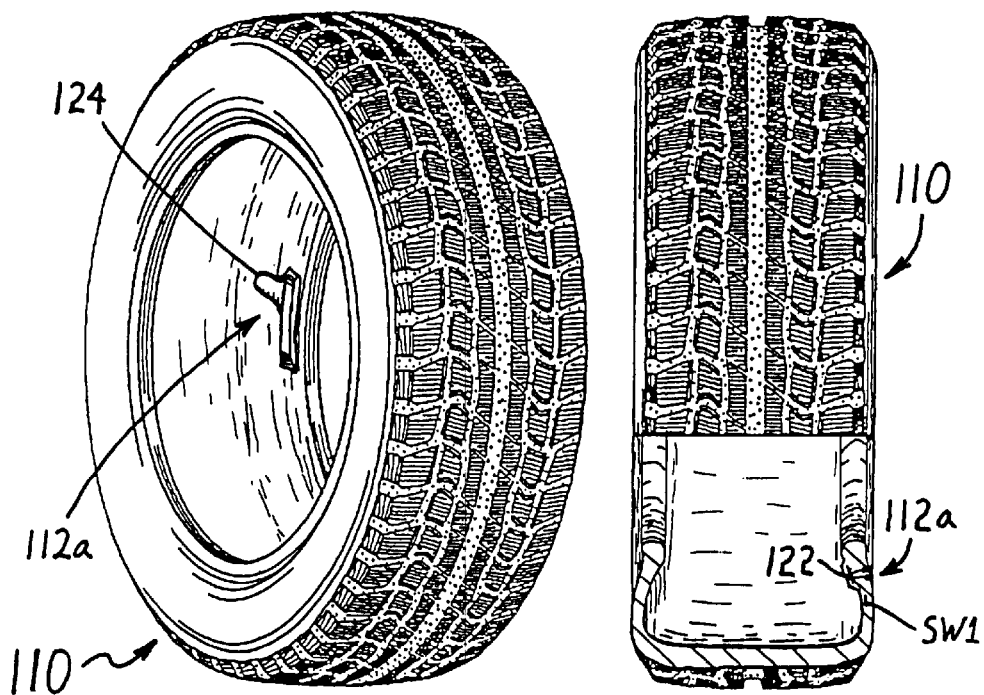

FIG. 16 Automotive Wheel with interior molded Safety-Light circuit.

FIG. 17 Section View of Automotive Wheel in FIG. 16.

Figure 18:
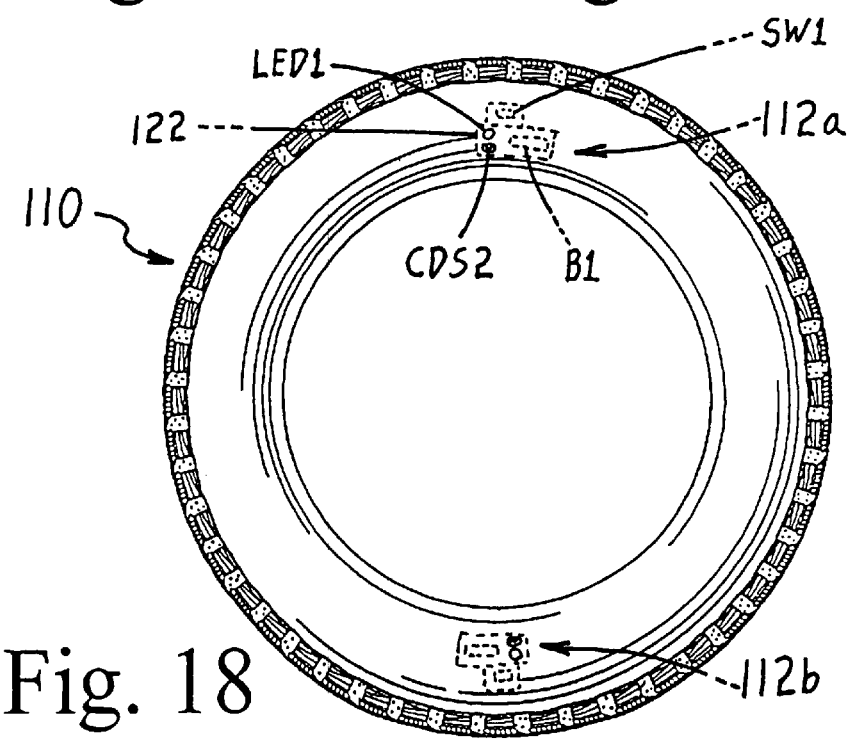

FIG. 18 Side View of Automotive wheel in FIG. 16.

Figures 19, 20:
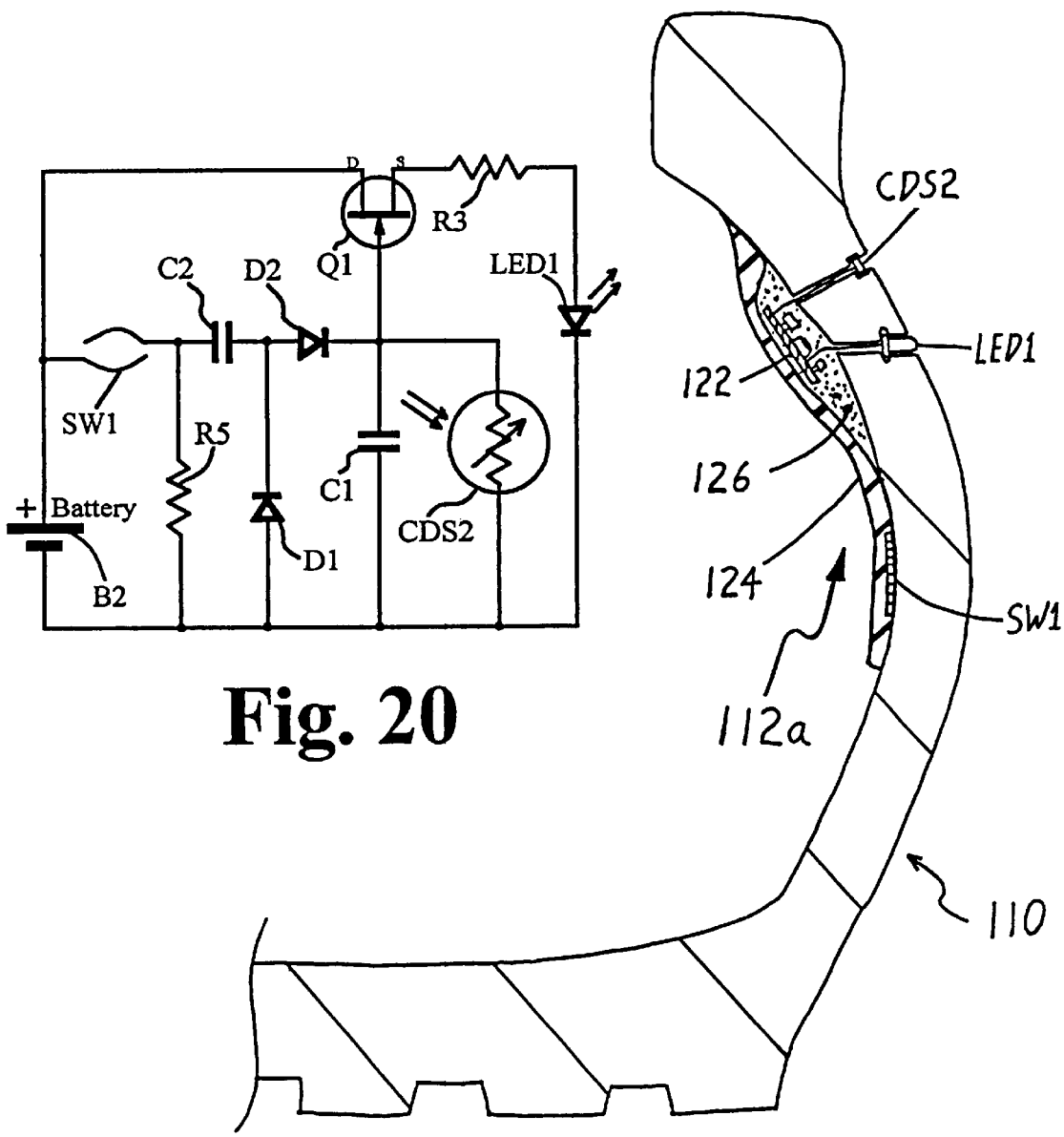

FIG. 19 Close-up Section View of Safety-Light Circuit in FIG. 16.

FIG. 20 Circuit diagram of Safety-Light 112a shown in FIGS. 16 through 19.

The Safety Light disclosed here is an illumination circuit designed to conserve battery power for times when a wheel is in use and is also in low ambient lighting. Further power savings is obtained by timing the activation of the illumination device only for times when it is not hidden from direct view behind wheel channels or fenders. This is easily accomplished by using one or more pressure switches per illumination device to control the activated region for the illumination device. Each switch would be able to illuminate the illumination device for a specific portion of the wheel's rotation. A photo-sensor is used to detect light levels and is only active for a short time each revolution near the ground. This assures that the photo-sensor is not obscured by the wheel supports when actively sensing ambient light levels. The use of a pressure switch (deformation-activated switch) within the wheel is used not only to detect when the wheel is in use, but also to provide timing for the photo-sensor activation. The photo-sensor and its associated pressure switch are placed on the same portion of the wheel so that when the tire section of the wheel is deformed by contact with the ground, the photo-sensor is also near the ground. This assures that the photo sensor is unobstructed at the time of activation. This ability to coordinate the activation of the photo-sensor circuit with its rotational position greatly simplifies the circuit design for sensing the ambient light levels, and also eliminates the need for a delay circuit to average ambient light conditions. With automatic control of this safety light, battery power is used only when it is actually needed. This greatly extends battery life, making it possible to construct circuits that last the life of the assembly. With no batteries to change, and no switches to push, the circuit can be molded directly into the assembly, reducing parts and manufacturing costs, while at the same time improving reliability. It has the added benefit of working automatically so children and the forgetful will still be protected at night. The elimination of batteries to change, no external switches, and automatic activation at night make this safety light truly remarkable.

DETAILED DESCRIPTION OF THE PREFERRED EMBODIMENTS

FIGS. 1 through 8 show several different designs for the disclosed safety light. Each design must have its deformation-activated switch molded into, or mounted onto, the tire section of the wheel assembly. The tire section must be made of an elastic material that deforms sufficiently while rolling to activate a switch. One should note that even hard plastics deform under the weight of a rider or vehicle, and with the use of a strain gauge circuit, even small strains (deformation) in the material can be detected. In this way, the deformation of the elastic material can causes activation of a circuit. The deformation-activated switch itself can take several forms. It can be just a simple button switch for soft urethane tires, or as complex as a strain gauge detecting circuit for hard plastics, or any of a host of pressure pads, switches, torsion switch, and other force, strain and torsion activated devices. The use of the term "deformation-activated switch" is probably a better general description of the switches that can be use with this invention, but its is long-winded, and is tedious to use in discussing the circuits described below. Thus, for the remainder of this discussion we will use the term "pressure switch" to generally describe any of the above devices which can be used to detect deformation of an elastic medium.

With reference to the drawings, we see the safety light circuit in FIG. 1. This is the simplest of the designs and constructed of a battery 20, a pressure switch 22, and an illumination device 24. Power is conserved by only having the illumination device 24 active for a short time each revolution of the wheel it is mounted in. When in use, all current from battery 20 flows in series through pressure switch 22, and illumination device 24. Pressure switch 22 act as the control, passing current to illumination device 24 only when external forces activate it. Similar circuits can be found in shoes with built in lights that activate upon heel strike. These shoes use a pressure switch to detect the deformation of the rubber sole material, and switch on with applied pressure. Though the circuit is well known, its benefits when used in a roller blade wheels, skate wheels, automotive tires or other elastic wheels is far from obvious. We personally dismissed the idea of using a pressure switch for the roller blade wheel (in-line skate wheel) even though the first prototype constructed was made from the components salvaged from deformation-activated lighted shoes. One just does not think of the hard tire on a roller blade wheel as deforming as it rolls; the wheel always looks so solid. But the fact is, with a rider, the tire portion of a roller blade wheel does deform sufficiently to activate a pressure switch. It was actually several months later when we realized that a number of the problems associated with using an acceleration switch to activate a lighting circuit could be solved by using a pressure switch (deformation-activated switch, pressure pad switch, force-activated switch, etc.) instead. This patent is the result of that work. One of the unusual advantages of using a pressure switch is that one can tailor the portion of the wheel's rotation that the illumination device is lit. In-line roller skates have a pair of wheel supports (see FIG. 13) which cover about ⅔ of the wheel. Thus, light emitted when behind these supports is blocked by the supports. The circuit in FIGS. 1 through 3 can be tailored to only turn "on" the illumination device 24 during the ⅓ (120 degrees) of each revolution that it is unobstructed by the supports. This effectively reduces the energy use by a factor of 3. Such a drastic reduction in power usage with little reduction in light output has until this point only been accomplished with the use of much more complicated photo-sensing circuits (see FIGS. 4 through 8 and FIGS. 10 through 12).

Pressure switch 22 can be of several designs which can be activate by the deformation of the tire portion of a wheel. Pressure switches, force switches, pressure sensitive pad, strain sensors with appropriate circuitry, or other devices that becomes conductive when placed under pressure, strain, or torsion can be used. A simple force switch aligned radially can be activated by the pressure on the tire as it interacts with the ground (see FIG. 15). There are many designs of force activated switches and the art is well known. All that is needed is for the switch to be placed correctly within the tire section of the wheel so that strain(pressure) or torsion (bending) experienced by the tire as it rolls, presses the switch in the correct direction(s) to activate it. Pressure sensitive pads can be molded directly into the elastic tire so that pressure changes within the wheel as it rotates against the ground causes the pad to become conductive. Strain gauge devices can also be used, where a circuit would detect rapid changes in the resistance of the strain gauge as it is pulled and bent within the elastic tire during use. Such a circuit would conduct current when a resistance change was detected and could include a delay circuit within it to simulate an actual pressure switch response.

Illumination device 24 can consist of one or mote light producing devices. If the circuit uses a Light Emitting Diode (LED), then a resistor may be added in series to limit current. However, in the disclosed designs, this resistor is generally not needed if a small button batteries is used, since such batteries have a maximum current of approximately 50 milliamps(ma) due to internal resistance of the battery. A series resistor may still be used if lower current levels are desired to extend battery life. If the circuit is used in a motor vehicle tire (automotive, motorcycle, recreational vehicle, etc.), a series resistor is needed to limit current to the LED, because a larger battery is used to provide longer life (approximately 1000 hours). Other illumination devices can also be used including any of the lighting devices now available, however, few can compete with the energy efficiency of the LED.

Battery 20 can be any battery comprising one or more cells of lithium, alkaline, carbon zinc, fuel cells, supercapacitor, or any other self-contained current source. Two or more cells may be needed in series to have sufficient voltage to operate illumination device 24. To save on battery size, the battery or batteries should be of a voltage as close to the operating voltage of illumination device 24 as possible to improve efficiency. Also the in-series voltage drop across deformation-activated switch 22 should be very small since it is an ohmic contact and has little effect on the voltage received by illumination device 24. If a strain gauge circuit is used as deformation-activated switch 22 then there will also be an associated voltage drop across the electronic switch controlled by the circuit. If the illumination device is a LED and battery 20 is large, a series resistor may be need needed to limit current through the LED.

It should also be noted that additional pairs of pressure switch 22 and illumination device 24, can be placed electrically in parallel to the switch 22 and illumination device 24 without changing the general operation of the circuit (see FIG. 3). Each switch would control its own illumination device which could be activated at different times on the wheel as it rotates. In this way each LED would be illuminated as its associated pressure switch was activated. Likewise, additional pressure switches can be placed in parallel with pressure switch 22 to increase the portion of the wheel revolution where the circuit is active, as seen in FIG. 2. The placement of additional illumination devices in parallel with illumination device 24 would increase the light output by having more LEDs active at one time.

In FIG. 2 we see a safety-light circuit that is designed to be placed in an elastic wheel similar to that in FIG. 1. A second pressure switch has been added so that either pressure switch 22 or pressure switch 26 can activate illumination device 24. This second switch is added to extend the duration of time that illumination device 24 is producing light during each revolution of the wheel. Each pressure switch embedded in the elastic tire is unlikely to be activated for more than one-quarter turn (90 deg.) of the wheel rotation. This is because the deformation caused by contact with the ground extends only a short distance around the tire and thus can not be detected by switch 22 or 26 until its portion of the tire comes in contact with the ground. With a two(or more) switch design, the "activated" region is extend by allowing multiple pressure switches to activate the same illumination device at different times in the wheel's rotation. If the pressure switches are place with sufficient angle between them, the illumination device will shut off in-between activation of the switches. This produces a flashing effect that may be desirable. The circuit can also have more than one pair of pressure switches and. illumination device combination connected electrically in series with the battery. That is, the circuit two state normally open switches 22 and 26, and illumination device 24 can be duplicated and connected in parallel to the existing one so that two separate illumination circuits can be placed on the wheel while still using a single battery 20.

In FIG. 3 we see deformation-activated switch with a delay circuit 38 connected to illumination device 24 and battery 20 in series. Deformation switch 38, conducts current though illumination device 24 when elastic deformation of the tire material it is mounted to is detected. Deformation switch 38 continues to conducts current though illumination device 24 even after deformation of the tire is no longer detected. This happens because the delay circuit within switch 38 keeps current flowing through switch 38 for a predetermined time after deformation of the tire is no longer detected (FIG. 9 shows one example of such a delay circuit). As in FIG. 1 and 2, additional deformation switches and illumination devices can be added in parallel without changing the general function of the circuit.

In FIG. 4 we see another circuit designed for placement on a wheel. A photo-sensor 40 with photocell 54 is added to the circuit to allow the circuit to only operate in a dark environment. Photo sensor 40 is designed to pass current when ambient light levels drop below a predetermined level. Deformation switch 35 only allows current to pass when it is detecting deformation of the elastic tire material it is in contact with. Ground 37 is added in this case to show how a strain gauge circuit might be set up as the deformation-activated switch 35. To provide sufficient voltage drop to operate the strain gauge control circuitry, most of the battery voltage will be needed and ground 37 provides this. Likewise ground 42 is optional and provides additional voltage drop for the photo-sensor circuitry.

As always, additional deformation switches and illumination devices can be added in parallel without changing the general operation of the circuit as seen in FIGS. 5 and 6. Note that current does not flow through the illumination device unless both deformation switch 35 and photo-sensor 40 are conducting current. Thus, current can only flow when the wheel tire is deformed because of pressure exerted on it by a rider or vehicle, and at the same time the ambient conditions are sufficiently dark. For proper operation switch 35 should be placed near the photo-sensor's photocell 54. This is so the point where the circuit is activated (strain gauge or switch detecting deformation against the ground) with the photocell near the ground. This places the activation point far from any shroud over the wheel that could cast a shadow on the photocell. Thus, a much better actual reading of the ambient light level is obtain. This is especially true when the circuit is placed on a wheel that has an extended fender or wheel support that covers a large portion of the wheel. The placement of pressure switch 35 and photocell 54 near each other, thus, allows the ambient light levels to be detected near the ground where switch 35 is activated. Also note that for a partially shrouded wheel, illumination device 24 also needs to be placed near pressure switch 35 and photocell 54 so that it is in the open to project light outward when the circuit is activated. Also note that this circuit is intermittent, that is, it only produces light while switch 35 is closed. Thus, the illumination device 24 is only "ON" for a small percentage of each revolution. This percentage can be increased by using a long pressure pad that allows a moving contact point on the switch. Such a pressure pad can be tailored to conductive over a larger angle of rotation and thus produce a desired illumination angle.

In FIG. 5 we see a safety light circuit which is a modification of the circuit in FIG. 4. This circuit uses two deformation-activated switches 30 and 31 to lengthen the illumination angle. The circuit comprises a battery 20 to power the circuit, two pressure switches 30 and 31, illumination device 24, and photo sensor circuit 40. Two or more pressure switches allow multiple conduction paths to illumination device 24 and thus allow a wider illumination arc (angle). The pressure switches are molded into the elastic portion of the wheel so that deformation of the wheel causes the pressure switch(s) to conduct electricity to the rest of the circuit. Placement of the two switches around the circumference of the tire allows the lighting output to be custom tailored by proper positioning of the pressure switches. Each switch may have a 30 to 90 degree arc over which it is conductive due to deformation of the elastic tire material. If positioned correctly the switches can provide twice the active angle of one switch. If the switches are placed further around the tire from each other, two separate conductive phases result, which would light the illumination device twice each revolution, provided ambient light levels are low enough. The illumination device should be placed near the switches so that it is not hidden behind wheel supports. Depending on the how much shrouding is around the wheel, pressure switches 30 and 31 may need to be placed near the photo-sensor's photocell 54 for proper operation of this circuit. If photocell 54 is placed between the two switches it will have the best chance of being unobstructed when each switch is activated (pressure switch near ground).

In FIG. 6 we see basically two circuits similar to the circuit seen in FIG. 4 connected to one battery in parallel. Deformation switch 30, photo-sensor1 40, illumination 33 make up one circuit and deformation switch 31, photo-sensor2 40, and illumination device 32 makes up the second circuit. As in FIG. 5 each photo-sensor and illumination device pair can have more than one deformation-activated switch to provide illumination over a wider rotation angle of the wheel. Also each photo sensor and switch pair can have multiple illumination devices if desired.

In FIG. 7 we see a circuit that uses a photo-sensor 60 with a delay. The delay circuit continues to pass current in the dark to the illumination device 24 when switch 22 de-activates. If sufficient light is detected by photocell 62 then photo-sensor 60 stops current from flowing to illumination device 24. Switch 22 can be viewed in this case as a triggering switch, which causes photo-sensor 60 to activate and conduct current through the illumination device. The result of the delay in photo-sensor 70 is that the illumination device can be made to remain "on" once the photo-sensor has been activated. Thus, when used in the dark, activation of switch 22, would cause photo-sensor 60 to power-up and take a reading of the ambient light level. If the light level is low enough current is passed through the photo-sensor and through illumination device 24. Shortly after this, switch 22 opens (stops conducting current), but current continues to flow to illumination device 24 by passing through line 63, and through photo-sensor 60. Each revolution of the wheel would reactivate switch 22 and reset the delay in photo-sensor 60. The delay can be made almost any length of time, from a fraction of a second to several minutes. Several minutes would allow one to keep the lights on even when the rider stops to rest. Two or more illumination devices placed physically around the wheel and electrically in parallel with illumination device 24, makes a very decorative design that provides a continuous light output. Normal configuration for this circuit would use 2 LED's placed opposite each other on a wheel (see FIG. 14).

In FIG. 8 we see a circuit that uses a single photo-sensor to control two illumination devices. This circuit accomplishes the same thing as the circuit in FIG. 6, but uses only one photo-sensor, thus reducing the cost of the circuit. Also note that this circuit does not produce the continuous light output that the circuit in FIG. 7 does. Instead illumination devices 32 and 33 produce light only when its respective switch, switches 30 and 31 respectively, are activated. Photo-sensor 70 is activated by switch 31 through line 74. If the ambient light level is low enough when switch 31 is activated the photo-sensor will become conductive and passes current through the illumination devices when its respective switch is activated. Thus, switch 31 and photocell 72 should be placed near each other on the wheel to detect light near the bottom of its rotation and avoid obstructions that can create shadows. Once the photo-sensor is activated, the delay circuit within the sensor keeps the circuit open to current flow. Thus, as switch 30 and illumination device 32 rotates to be activated, photo-sensor 70 is still conducting so illumination device 32 is activated as switch 30 conducts current. When switch 30 disconnects (de-activates, non-conductive) illumination device 32 is shut off. Likewise, illumination device 33 is only active when switch 31 is conductive. Note that more switch/illumination device combinations can be added in parallel with switch 30 and illumination device 32 to provide more even illumination without the need for any more photo-sensors. The delay within photo-sensor 70 need only be greater than the anticipated time needed for the wheel to rotate from switch 31 to switch 30, because the photo-sensor will reset itself when switch 31 is activated again. Thus, any time delay of one second or more should be sufficient, but longer delay times allowing the user to produce light by activating switch 30 even when standing still (until the delay runs out).

FIGS. 9 through 12 show schematics of specific circuits that are examples of those circuits seen in FIGS. 1 through 8. Below is a list of common components for these circuits.

B1 Panasonic 3 v lithium battery 2032

B2 Generic 3 v lithium battery approx. AA size

CDS1 Cadmium Sulfide Photo-resistor (variable resistance=400 Ω-light to 500 kΩ in dark)

CDS2 Cadmium Sulfide Photo-resistor (variable resistance=50 KΩ light to 50 MΩ in dark)

LED1 Red Super Bright LED from LiteON

LED2 Red Super Bright LED from LiteON

SW1 Pressure pad switch (normally open)

SW2 Pressure pad switch (normally open)

SW3 Pressure button switch (normally open)

SW4 Generic switch capable of closing a circuit when detecting deformation of material it is enclosed in.

SW5 Generic switch capable of closing a circuit when detecting deformation of material it is enclosed in.

Q1 N-channel JFET-NTE458 (low voltage-high gate impedance) Note: N-MOSFET transistors operate similarly C1 0.1–10 microF for an approx. 5 to 500 seconds delay respectfully D1 Any standard diode D2 Any standard diode R1 1/16 W 51 kΩ

R2 50 MΩ (works well with R1=20 M, but C1 must be 2.5 times larger to create the same delay in FIGS. 11 and 12)

R3 Optional resistor 1/8 W approx. 20 Ω to protect LEDs when larger battery is use. Small battery B1 provides sufficient internal resistance to protect LED1 and LED2

R4 20 MΩ

R5 100 kΩ to 20 MΩ depending on activation light-level desire. R5 resistance from 10 to 50 times less than CDS2 resistance in full darkness works well.

In FIG. 9 we see a simple circuit schematic that is an example of the circuit diagram in FIG. 3. FIGS. 1 and 2 are also examples of this schematic without the delay circuit. The delay circuit comprises transistor JFET Q1, capacitor C1, resistor R2 and resistor R4. Switch SW2 controls the current to LED1 and LED2 by controlling the gate on JFET Q1. When SW2 is activated, current flows and charges capacitor C1, which opens JFET Q1. With JFET Q1 opens, current can flow through LED1 and LED2 and provide illumination. With capacitor C1 charged, switch SW2 can now be opened (non-conductive) without the flow of current to the LEDs being stopped. As the charge on capacitor C1 drains through resistor R4, transistor JFET Q1 slowly closes, cutting off current. This delay allows continuous illumination of the LEDs by repeated detection of deformation in the tire. Thus, the LEDs are active for the full revolution of the tire they are mounted on, instead of a portion of rotation like the circuits in FIGS. 1 and 2. Resistors R2 and R4 provide a voltage divider to keep JFET Q1 closed when switch SW2 has not been activated. With resistor R2 equal to 50 Megohms and resistor R4 equal to 20 Megohms, the voltage across the drain and gate is kept negative. This keeps the gate on JFET Q1 closed (non-conducting), and the small leakage current through JFET Q1 is not allowed to build up on capacitor C1. With the values stated above the leakage current through Q1 is so small it would take over 200 years to drain even the small button battery B1. Battery B1 has sufficient internal resistance to limit current through the LEDs to less than 50 milliamps. If a larger battery is used, such as for motor vehicle wheels, then resistor R3 is needed to limit current flow through LED1 and LED2. If current is not limited, the LEDs would be burned out by the excess current(assuming 3.0 volt battery voltage). Switches SW2 is molded directly in contact with the elastic tire portion of a wheel assembly. For an in-line skate wheel this would mean it is molded inside the tire material itself For an automotive tire it would mean the switch sensor could be placed in the sidewall of the tire where deformation is greatest, though the tire's tread also deforms as it makes contact with the road or surface. Many different kinds of pressure sensors could be used. In FIG. 9, we show pressure switch SW2 as a pressure pad that can be of standard design. The pad has a conductor on each side of the pad with an airspace in between. When the pad is twisted or pressed, the two conductors make contact and current is conducted through the switch to its respective LED.

In FIG. 10 we see a similar circuit that uses a photo-sensor to control output from illumination device LED1. This circuit is an example of the circuit shown in FIG. 4. It is also and example of FIGS. 5 and 6 with slight modifications. Switch SW3 in this case is a simple normally-off pressure switch. Deformation of the tire material actuates the switch to activate it. Resistor R1 and photo-resistor cell 54 create a voltage divider that provides a voltage to the base of transistor 58. When photocell 54 detects a lighted environment its resistance drops to as low as 300 Ω in bright light. If resistor R1 is around 51 kΩ then the voltage on line 60 is too small to activate the base of transistor 58, so LED1 is off, even if switch SW3 is conducting. In the dark, photocell 54 has a resistance as high as 500 kΩ and the voltage on line 60 at the base of transistor 58 is high when switch SW3 is pressed. Thus, when switch SW3 is activated and photocell 54 is in a dark environment, transistor 58 conducts current through LED1 to illuminate it. In practice, this circuit transitions slowly from being "off" in the light and being "on" in the dark. Changing the resistance of resistor R1 and/or the resistance properties of photocell CDS1, allows light level where this change takes place to be adjusted Use of a digital switch, or other such circuit instead of transistor 58 can make the transition between "on" and "off" ambient light levels very sharp.

In FIG. 11 we see a photo-sensor circuit with a delay for slowing the turn off of the circuit when switch SW1 is no longer conductive. The circuit is essentially the same as the circuit in FIG. 10, but has a delay circuit comprising resistor R2, diode D1, and capacitor C1. When switch SW1 is closed (conducting) power is supplied to the rest of the circuit. R1 and CDS1 form a voltage divider and depending on the ambient light conditions at that time, the voltage between R1 and CDS1 can vary greatly. R1 and CDS1 are selected so that the divided voltage that appears on the gate of JFET transistor Q1 is produced by a chosen level of ambient light. Current can flow to the gate of JFET Q1 through both R2 and D1, while at the same time charging capacitor C1 to that voltage. After switch SW1 no longer senses deformation of the tire (open circuit, non-conducting) the voltage stored on capacitor C1 keeps JFET Q1 conducting. As charge drains from capacitor C1 through resistor R2, the voltage on the gate of JFET Q1 begins dropping which eventually closes the gate and cuts-off current flow to LED1 and LED2. The value of resistor R2 is chosen so that C1 discharges at the desired rate. Large values for R2 allows for capacitor C1 to be made smaller for the same time delay. As long as capacitor C1 is sufficiently charge, JFET Q1 will be conducting and current can flow through LED1 and LED2 to provide illumination. Note that with each revolution of the wheel capacitor C1 is recharged (providing it is dark enough), so delays less than one second still provide near constant illumination of LED1 and LED2. Also note that in a standard wheel additional LEDs could be added in parallel with LED1 and LED2 to provide additional light around the circumference of the wheel. Resistor R3 is optional and used if larger batteries are used which can provide destructive levels of current through LED1 and LED2.

In FIG. 11, note that switch SW1 only provides current to activate the photo-sensor and delay circuit, but no significant current through LED1 and LED2. Switch SW1 only determines when to activates the photo-sensor circuit. Thus, the state of the photo-sensor circuit determines the current flow through LED1 and LED2. When the photo-sensor is activated, transistor Q1 conducts current to LED1 and LED2. JFET Q1 in this schematic is a N-channel JFET (NTE458) which has a low activation voltage and also a low voltage drop across the source and drain when open. This voltage drop is important if a small 3 volt lithium button battery is used because it reduces the maximum current that the circuit can pass through LED1 and LED2. During operation, lithium battery B1 provide a current of approximately 15 milliamps through LED1 and LED2 which can handle as much as 50 milliamps each for extended periods of time. When a current of 15 milliamps is present through LED1 and LED2, the 3.1 volt battery voltage is divided between three components: (1) the internal resistance of battery B1 (0.7 volts), (2) transistor Q1 voltage drop (0.5 volts), and (3) LED1 and LED2 voltage drop (1.9 volts). Thus, a little less than ⅔ of the voltage actually is used to produce light in this circuit.

In FIG. 12, we see a circuit that provides selective intermittent illumination of light emitting diodes LED1 and LED2. Switches SW4 and SW5 are deformation sensitive switches that are mounted in a wheel tire in such a way that rolling pressure of the tire against the ground deform. s the tire sufficiently for the switch to detect the change in shape of the tire material. In this way, each switch is activated (conducting) as its section of the tire rolls against the ground. The circuit also has a photo-sensor circuit with a delay which comprises, resistors R1 and R2, photocell CDS1, diode D1, capacitor C1 and JFET Q1. In this design, light emitting diodes LED1 and LED2 do not provided continuous illumination when activated in the dark like FIG. 11. Instead, the circuit in FIG. 12 provides intermittent illumination only when switches SW4 and SW5 are active, switch SW4 illuminating LED1 and switch SW5 illuminating LED2. The photo-sensor and delay in FIG. 12 is the same as that shown in FIG. 11, however, switch SW5 is the only switch that provides the activation power for the photo-sensor circuit. Thus, the activation position of the photocell CDS1 is determined by its physical relationship to SW5. When switch SW5 is activated in the dark, current flows through the voltage divider comprising resistor R1 and photocell CDS1, and begins charging capacitor C1 through resistor R2 and diode D1. If the voltage between R1 and CDS1 is high enough, JFET Q1 opens and passes current. Because the value of R2 is large, the charge on C1 can only leak out slowly. This means JFET Q1 can remain conductive for a significant period of time after switch SW5 is re-opened(nonconductive). Thus, as the wheel continues to rotate, and switch SW4 is activated, JFET Q1 is still conducting and LED1 is illuminated. Additional LEDs and switches can be place in parallel with those shown for additional lights.

In FIG. 13, we see a typical in-line roller skate 80, having a boot section 83, wheel supports 81a and 81b, and a set of four safety light wheels 100. The wheels have a standard sized central hub 84 which receives standard bearings 86. Flexible circuit board 82 is completely sealed withing translucent urethane tire 88, which allows light to shine outward from light emitting diodes LED1 and LED2. The urethane also allows ambient light to shine inward onto photo-resistor CDS1. Circuit board 82 provides a support for the circuit seen in FIG. 11. The positioning of electronic components within the in-line skate wheel is more closely shown in FIGS. 14 and 15. Wheels 100 are attached between wheel supports 81a and 81b with a pair of wheel bearings 86. The wheel bearings allow the wheels can rotate freely within the supports. Note that wheel supports 81a and 81b cover a large portion of the wheels within a channel between the supports. This channel is much darker than the ambient light condition and would provide inaccurate readings if the photocell where to take a measurement while inside the channel. To prevent this, photocell CDS1 is placed near deformation detecting switch SW1 so that it is activated near the bottom of its rotation (near the ground). This places photocell CDS1 away from any obstructions that might cause inaccurate measurements. The photocell CDS1 is also placed as far away from LED1 and LED2 to prevent illumination of the photocell by the LEDs, and thus give a false reading.

Note that placing LED1 and LED2 inside a dense polymer will cause the light coming from them to un-focus. If a more collimated beam of light is desired from the LEDs, some form of re-focusing device is needed. Normally, LEDs have built in lenses, however, if one surrounds the LED with a dense transparent material, it acts to cancel the effect of the LED's len. There are three ways one can keep the light coming from the LEDs focused. First, a concave air-space can be placed in front of the LED lens to counter the effects of the dense polymer. Placing a concave air space inside the LED housing can provide proper focusing of the output light, but would require a new LED design which could be expensive. Second, the lens tip of the LEDs can protrude out of the tire section and thus, not be effected by the dense polymer used for the tire. Many LEDs have a 30 degree viewing angle or smaller. If the LED is allowed to protrude out of the urethane tire the light output will be essentially the same as the LED alone. With a narrow beam the LED will give very bright light when viewed from the side of the wheel. To protect the protruding tip of the LED, it may be desirable to put the protruding tip at the bottom of a small indentation in the urethane tire. In this way, the LED lens is positioned below the remainder of the tire's outer surface, and thus, less likely to be scratched or struck. Third, the urethane tire itself can have a convex lens molded on the outer surface. If the LED is placed directly below this molded lens the light can be refocused to give brighter light to the sides of the wheel.

In FIG. 14 we see a partially sectioned in-line roller skate wheel 100. Standard Wheel hub 84 (central hub) supports both circuit board 82 and urethane tire 88 and also provides an axle mount through the center. Circuit board 82 has tongues that fit into small slots 96 and large slot 94. During molding of tire 88 these slots are filled with urethane, completely enclosing the circuit board, and sealing it within the wheel. The circuit design in wheel 100 is shown in FIG. 11. Because of the heat involved in injection molding the urethane tire section around the circuit board, it may be desirable to pre-coat circuit board 82 with an insulating coating (not shown). In this way the tire would have time to cool before electronic components were heated to too high a temperature. Most of the components are relatively insensitive to temperatures experienced during injection molding, but the battery should be kept below the boiling point of water to keep from being damaged. Because of this, just the battery may need to be insulated to insure full battery life is retained. The section of circuit board 82 containing Battery B1, fits into large slot 94 in central hub 84. If slot 94 is sized just to fit the battery B1, the plastic the central hub is made out of acts as an insulating layer and can protect the battery from overheating. Quickly cooling the wheel after it comes out of the mold will also reduce heating. The remainder of the components are shown placed within the small slots on hub 84. Photo-resistor (photocell) CDS1 is placed as far as possible from LED1 and LED2 to reduce the chance of the LEDs illuminating the photocell. The hub slots act as partial shrouds to block LED illumination from reaching the photocell. Standard in-line roller skates wheels already have slots in there hub and would only need minor changes to allow for the larger size of the battery. Tire 88 can be made of any of a number of durable transparent polymers, clear urethane being the most commonly used. The reader should note that standard in-line skate wheels come in a hard plastic version where the hub and tire section are a single unit (no separate hub). Such skate wheels are easily adapted to this design, thought the deformation sensor must be more sensitive to detect the much smaller deformation. A standard strain gauge can be molded into the hard plastic wheel, and can easily detect the small physical deformation as the wheel rolls along a surface. A standard strain gauge circuit would be used to convert the changing resistance in the strain gauge to a signal that could be sent to the disclosed circuit designs in this application.

In FIG. 15 we see another partially sectioned in-line roller skate wheel 101. It is designed exactly the same as wheel 100 in FIG. 14, except a push-button pressure switch SW3 has replaced the pressure pad SW1. The switch rests in an air cavity 102 which can be filled with a compressible foam if desired. Switch SW3 is connected to circuit board 82 with switch button 104 extending outward from the hub and resting against the top surface of cavity 102. As the wheel rotates, pressure on tire 88, presses in radially on cavity 102, pressing inward on button 104 and activating switch SW3. With photocell CDS1 placed near switch SW3, the circuit will activate photocell CDS1 near the bottom of its rotation and taking an ambient light measurement there. This avoids most shadowing due to the wheel support housing and the like.

In FIGS. 16 through 19, we see an automotive tire 110 with two safety lights 112a and 112b installed on the inner surface of the tire. This particular tire is designed for installation on a standard automotive wheel hub (not shown). The circuit is attached to tire 110 by vulcanizing the circuit to the inner wall of the tire. The safety lights would also work well if vulcanized to the outer surface of the tire. The circuit can also be directly molded into the tire sidewall during manufacture. Safety lights 112a and 112b comprise a circuit design similar to that shown in FIG. 20 to provide continuous illumination at night while driving. Battery B2 is a lithium battery approximately size AA at 3 volts and provides at least 250 hours of continuous use in the circuit shown in FIG. 20. The single lithium battery could easily be replaced with two standard alkaline AA batteries that provide about the same energy output and voltage. A standard automotive tire lasts about 1000 hours (50,000 miles at 50 MPH) depending on use. Batteries B2 would last the full life of the tire assuming 25% driving at night. This is vary reasonable since statistically only about 18% of all driving occurs at night. And since ones chances of being in an accident at night is considerably greater than during the day it makes good sense to make sure ones car is as easy to see as possible. According to MADD (Moms Against Drunk Drivers) 1-in-13 drivers at night are drunk during the week, and 1-in-7 are drunk while driving at night on the week-end.

In FIG. 16 we see the placement of light 112a within tire 110. Note that safety light 112b is hidden by the tread of the tire. Most of the space taken up by the circuit is for the batteries. Flat battery packs can also be used to mold the battery more closely to the tire, especially if the circuit is going to be molded on the exterior of the tire. The entire circuit is held in place with a polymer panel 124, which is vulcanized over the circuit board and batteries.

In FIG. 17 we see a partial cutaway view of automotive tire 110, sectioned through safety light 112a. Circuit board 122 and deformation switch SW1 are molded onto the inner surface of the tire with photocell CDS2 and illumination device LED1 extending through the sidewall of tire 110 to be visible from the exterior. The holes for the photocell and LED can be placed in the tire during manufacturing or after the tire has been made. The vulcanizing of polymer panel 124 helps strengthen the area weakened by the two small holes (see FIG. 19). Extra reinforcement webbing can also be added in the area to strengthen it. Clear polymer windows can be applied over these holes to protect them from the environment. These windows would allows light to project out from the LED and light to fall onto photocell CDS2. At night the LEDs would alert motorists of a vehicle's presence on the road and has the potential to reduce side impacts accidents at night. The safety light shown may also be used on motorcycle tires to provide a strong visual cue that a two wheeled vehicle is present. In fact, its greatest potential to save lives is probably its use on motorcycles tires.

In FIG. 18 we see a side view of the automotive tire 110. Two separate and identical safety lights 112a and 112b are seen in shadow. The circuits are placed opposite each other on the interior of tire 110 to provide more even illumination. Each circuit has a photocell CDS2 and LED1 that are visible from the outside of the tire. Circuit board 122, deformation sensor SW1 and battery B2 are all molded into the tire.

In FIG. 19 we see a close-up section view of the safety light 112a in the automotive tire 110, with safety light 112b on the opposite side of the tire (see FIG. 18). Circuit board 122 is held securely in place by polymer panel 124. An optional foam pack 126 surrounds the circuit board to allow movement of the circuit board with respect to the tire flexing without being damaged. One of the possible circuits schematics for this safety light is shown in FIG. 20. From FIG. 19, it is easy to see that it may be advantageous to put the circuit on the exterior of the tire, because in the case shown, a flat tire (loss of air pressure) would result in the wheel rim (not shown) crushing the circuit board as it rolls. Placing the circuit on the outside also eliminates the need to make holes through the sidewalls of the tire, thus solving strength problems. Placing the circuit on the exterior of the tire also allows easy placement of the windows for the LED1 and photocell CDS2. Deformation-activated switch SW1 can be any one of several types of switches. In this case, we are using a pressure switch that conducts when placed under pressed and/or twisted caused by the tires sidewall deforming. The sensor can also be placed in the tread of the tire where contact with the ground deforms the tread from round to a generally flat portion against the ground. Note that we could also use a strain gauge and a standard strain gauge circuit to detect the rate-of-change in strain as the tire flexes and provide a signal for the circuits disclosed in this application (FIGS. 1 through 12).

In FIG. 20 we see one of the many possible circuit schematics that can be used in safety light 112a shown in FIG. 19. The circuit achieves a large number of functions with very few components. This circuit detects the change in state of switch SW1 to activate LED1, and delays deactivation independent of the state of the switch. That is, as long as the state of the switch is not changing the circuit deactivates LED1 after the predetermined delay. Photocell CDS2 is connected to keeps the circuit from activating if too much light is detected even if switch SW1 has changed state. The circuit also has a sharp cutoff point for ambient light, which allows easy tailoring of the circuit for specific light levels.

In FIG. 20, Battery B2 powers the circuit and is preferably a single cell 3 volt lithium AA sized battery to provide compact size and long storage life. Switch SW1 is a standard pressure sensitive switch placed within tire 110 in such a way that deformation of the tire material causes the switch to conduct current. To convert switch SW1's output to an rising edge sensor, resistor R5, capacitor C2, and diodes D1 and D2 are used to "pump" electrical current into capacitor C1 as the state of SW1 is changed from "off" to "on". Once capacitor C1 is charged, photocell CDS2 produces a timed delay depending on the its resistance. While C1 is charged, JFET Q1 is conductive and illumination device LED1 is "on". As C1 is discharged through CDS2, transistor Q1 slowly shuts off. Note that this timed deactivation of the circuit is independent of whether switch SW1 is in a conductive or non-conductive mode(switch not changing state). Resistor R5 determines how fast C2 can be discharged after being changed by the closing of switch SW1. If C1 is discharging more slowly than C2 then current can easily be built up on C1 by repetitive switching of switch SW1. However, if C1 discharges more slowly than C2 (resistance of CDS2 less than resistance of R5) then C2 will be unable to "pump" sufficient current to C1 to keep it charged and LED1 will remain off. Since CDS2 has a variable resistance the circuit activation can be controlled by whether the resistance of CDS2 is greater or less than the resistance of R5. In practice, when the resistance of CDS2 and R5 are equal, LED1 is essentially off with a current flow only about 50 microamps. Current through LED1 drops to 4 microamps when the resistance of CDS2 is one-half the resistance of R5. Similarly, when the resistance of CDS2 is 10 times that of R5, the circuit passes near maximum current through LED1. Resistor R3 is used to limit total current through LED1, since battery B2 can produce sufficient current to destroy the LED. A typical value for R3 is 10 to 20 ohms.

Photocell CDS2 is a high impedance photo-resistor similar to CDS1. However, where CDS1 has a resistance from 400 to 500 k$\Omega$, CDS2 has a resistance of 50 k$\Omega$ to 50 M$\Omega$(megohms). This high resistance is easily obtained by simply reducing the size of the photocell. Photocell CDS1 has an area of about 20 square millimeters. Since the resistance of the photocell is a function of its light exposed area the total resistance can be increased by simply making the photocell smaller. By reducing the size of CDS1 by a factor of 100, should result in a photocell that has the properties of CDS2. These smaller photocells should also be much less expensive to manufacture thus saving cost over other designs. Note that this type of edge detecting circuit will work on any of the wheels discussed in this application. If for some reason sufficient resistance is not possible by reducing the size of the photocell, standard photocell CDS1 can be used with transistors or operational amplifier circuits to control the discharge resistance of capacitor C1. In such a case, photocell CDS2 could be replaced with a transistor which could be controlled by a voltage divided circuit comprising a standard photocell and a resistor, much like the circuit formed by resistor R1, photocell 54 and transistor 58 in FIG. 10, except the circuit components would be optimized to provide very high impedances through the transistor. The higher the impedances can be made the smaller the values capacitors C1 and C2 can have for the same delay times. Also, photo-transistors and photo-diode can work much like photo-resistor CDS2 and provide a high impedance photocell resistance to drain C1 slowly. Thus, there are many possible light-sensitive high-impedance components that can replace photocell CDS2.

In operation, the circuit in FIG. 20, is placed on a tire with switch SW1 alternating on and off as the wheel rolls along the ground. The switch will be conductive for a shorter period of time than it is nonconductive because of the small zone where the tire deformation is sufficient to activate switch SW1. As switch SW1 closes,current rushes into capacitor C2 and through diode D2 to charge capacitor C1. If C2 is slightly larger than C1, then C1 can be fully charged with a single activation of switch SW1. If capacitor C2 is smaller than capacitor C1, it may take several activations of SW1 to fully charge C1. With C1 charged, transistor Q1 is activated and current flows to illuminate LED1. At the same time C1 begins to discharge through CDS2. If photocell CDS2 is in a lighted environment, capacitor C1 will discharge quickly, if it is in a dark environment, it will discharge much more slowly. When switch SW1 opens, capacitor C2 begins to discharge through resistor R5 and diode D1. Resistor R5 is chosen with a large value between 1 to 5 Megohms to reduce power drain if the circuit is stored in a state with SW1 conductive. [A value of 3 megohms for R5 gives a maximum "off" current of 1.0 microamps. In the "off" state with SW1 nonconductive, current flow is below 0.1 microamp. Since an automotive tire is much less likely to be stopped on the switch, the average "off" current is so small that it has little effect on battery life.] The reader should notice that the activation of transistor Q1 has a sharp cut-off resistance value for photocell CDS2. This is because the charging of C1 depends on whether C2 is charging (to pump current) faster than C1 is discharging. That is, C2 can only "pump" current at a maximum rate which is controlled by resistor R5. Thus, if C1 is discharging faster than C2 can be charged, the circuit will seek an "off" state. If C1 is discharging slower than C2 is being charged, then the circuit will build toward an "on" state by one or more activations of switch SW1. Because discharge rates are a function of voltage on the capacitors the actual "on" and "off" states are spread over a range, with a completely "on" state and a completely "off" state separated by a factor of 10 in the resistance value of CDS2.

SUMMARY, RAMIFICATIONS, and SCOPE

The safety light disclosed here has many applications including such important safety uses as lights on tricycles, bicycles, roller skates, mopeds, cars and motorcycles, which all use elastic tires. This safety light can be made very compact with very few components, and is made highly reliable because it can be hemispherically sealed within the elastic tire material itself. Permanently sealing the safety light in a wheel is made possible by a combination of innovations which reduce battery use to only times when it is needed, that is, when both the user is riding the vehicle and when a low ambient light level is present. Automatic activation of the safety light greatly improves its effectiveness by always being "ON" when needed, and does not rely on anyone to turn them on to be used properly. This also eliminates the need for external switches which is a major cause of reliability problems.

Although the above description of the invention contains many specifications, these should not be viewed as limiting the scope of the invention. Instead, the above description should be considered illustrations of some of the presently preferred embodiments of this invention. For example, many different configurations of the five basic components (elastic wheel tire, battery, deformation-activated switch, photo sensor, and illumination device) are possible, and many different configuration of each of these components already exist and are well known. Some of these configuration are shown in this disclosure, but room does not allow for discussion of the nearly endless ways these five basic components can be combined. Other option include substituting similar components for the components used. For example, the photo-sensing device can be any of a number of photo-sensors including photo-voltaic cells connected to a slightly modified circuit to provide a simple photo sensor circuit that activates a switch simply by the voltage it produces. Similarly, transistor JFET1 used in the circuits has a vast array of similar components that can replace it and even more components if the circuit is slightly modified. The types of tires and wheels shown in this application is not the limit of possible uses for the invention. Many other tires with elastic wheels could benefit from the disclosed circuits, which can be placed in any elastic tire that deforms when in use. This would include, but is not limited to, tricycles, bicycles, cars, motorcycles, roller skates, in-line skates, three wheelers, off-road vehicles, etc. Also, a simple oscillator could be added to any of these circuits to provide a strobe effect when the safety light is ON.

If a more collimated beam of light is desired from the LEDs some form of focusing device is needed Normally, LEDs have built in lenses, however, if one surrounds the LED with transparent urethane, or other dense polymer, it acts to cancel the effect of the LED's lens. Thus, either a concave air-space is needed in front of the LED lens, or the lens tip of the LEDs must protrude out of the tire section. Placing a concave air space inside the LED housing can provide proper focusing of the output light, but would require a LED of new design. Many LEDs have a 30 degree viewing angle or smaller. If the LED is allowed to protrude out of the urethane tire the light output will be properly focused, giving very bright light when viewed from the side of the wheel. To protect the tip of the LED, it may be desirable to put the protruding tip at the bottom of a small indentation in the urethane tire. In this way, the LED lens is positioned below the outer surface of the tire, and thus, less likely to be scratched or struck. Also the urethane tire itself can have a convex lens molded on the outer surface. If the LED is placed directly below this molded lens the light can be at least partially refocused to give brighter light to the sides of the wheel. Placing the LED so that it protrudes from the elastic tire also greatly reduces the amount of light feeding back onto the photocell, allowing the photocell to be placed near the LED.

Thus, the scope of this invention should not be limited to the above examples, but should be determined from the following claims.

I claim:

1. A safety light for a wheel assembly with an elastic tire section for rolling contact with a surface, comprising:
    an electronic circuit comprising:
        at least one deformation-activated switch;
        at least one illumination device;
        and at least one battery for providing electromotive power;
    an attachment means for attaching said electronic circuit securely to said wheel assembly;
    said deformation-activated switch mounted to said elastic tire section for detecting deformation in the tire and including a means to pass substantial current from said battery through said illumination device when the tire section is deformed by contact with the surface, whereby the switch is conductive for a predetermined arc portion of the wheel revolution while the switch is detecting deformation of its portion of the tire;
    said illumination device mounted to the wheel assembly for substantially projecting light out from said wheel assembly.

2. The safety light in claim 1, wherein said electronic circuit further includes a delay circuit;
    said delay circuit including a means of providing an electrical conduction path in parallel to said deformation-activated switch for conducting current from said battery through said illumination device for a predetermined time after the deformation switch no longer detects deformation of the tire.

3. The safety light in claim 2, wherein said electronic circuit further includes a photo sensor circuit having a photo sensing device for detecting low ambient light levels and connected to pass substantial current from said battery through said illumination device only after both said deformation-activated switch has detects deformation of the tire section and said photo sensor circuit has detected low ambient light levels.

4. The safety light in claim 1, wherein said illumination device is defined by a light emitting diode having an output lens that is molded into the tire section with said output lens protruding from the exterior surface of the tire section, whereby light emitted by the light emitting diode is focused by said output lens.

5. The safety light in claim 1, wherein said electronic circuit further includes a photo sensor circuit having a photo sensing device for detecting low ambient light levels, said photo-sensing circuit electrically connected to pass substantial current from said battery through said illumination device only when both said deformation-activated switch is detecting deformation of the tire section and said photo sensor device is detecting low ambient light levels.

6. The safety light in claim 5, wherein;
    said electronic circuit further includes a delay circuit for conducting current from said battery to said illumination device for a period of time after both low ambient light levels are detected and said deformation-activated switch no longer detects deformation of the tire.

7. The safety light in claim 5, wherein;
    said electronic circuit defines an edge detect circuit for sensing the change in state of the switch, and only activating a delay circuit when the switch changes state;
    said delay circuit conducting current through said illumination device for a predetermined period of time after activation and stopping current flowing through the illumination device when a change in the switch's state is not detected for said predetermined period time, whereby constant activation of the switch by constant pressure on the tire does not causes current to continue to flow through the illumination device beyond the predetermined period of time.

8. The safety light in claim 5, wherein;
    said electronic circuit further including a means for sensing a change-in-state of the switch, and only activating a delay circuit when the change-in-state is detected;
    said delay circuit conducting current through said illumination device for a predetermined time after activation, and stopping current flowing through the illumination device irrespective of the state which the switch is in, whereby the illumination device does not stay "on" even when the switch is paused or stopped in a conductive state.

9. The safety light in claim 5, wherein;
    said photocell and said deformation-activated switch placed near each other on the tire so that the switch activates as its portion of the tire rolls against the surface, whereby both the photocell and the switch are physically near the surface when the switch is activated, thus improving the chances of unobstructed measurement of the ambient light levels by the photocell.

10. The safety light in claim 5, wherein;
said photo-sensing circuit further includes a delay circuit which is activated when said deformation activated switch detects deformation of the tire;
said delay circuit having a means to keep the photo sensing circuit conductive for a period of time after said deformation-activated switch becomes nonconductive;
a second deformation-activated switch and a second illumination device are connected in series and placed in parallel electrically with the first switch and illumination device, thereby allowing current to flow through each illumination device when its respective switch is activated in a substantially dark environment.

11. The safety light in claim 5, wherein said wheel assembly is defined by an in-line roller skate wheel where said tire section is formed by a substantially translucent polymer tire molded around said electronic circuit and completely enclosing the circuit, thereby protecting it from environmental hazards, and allowing said illumination device to project light out through said translucent polymer tire; and said photo sensing device is mounted near said deformation-activated switch on the wheel, whereby said photo sensor device detects ambient light levels in the proximity of the surface on which said wheel assembly is rolling.

12. The safety light in claim 5, wherein said illumination device is defined by a light emitting diode having an output lens that is molded into the tire section with said output lens protruding from the exterior surface of the tire section, whereby light emitted by the light emitting diode is focused by said output lens.

13. A safety light for mounting on an elastic polymer tire, comprising:
an electronic circuit comprising;
a battery for providing electromotive power;
a pressure switch capable of detecting pressure and torsional force within said elastic polymer tire as it rolls on a surface, such that compression of the tire against the surface causes deformation within the tire sufficient to activate the switch;
a photo sensor circuit capable of detecting low light levels, having an electronically controlled conductance means associated with said photo sensor circuit and designed to conduct current when low light levels are detected; and
at least one illumination device for generating light and positioned to allow light to project out from said elastic polymer tire;
said pressure switch, and said electronically controlled conductance mean are placed electrically to conduct battery power through said illumination device only during times when both the pressure switch is activated by rolling on the surface and the tire is in a substantially dark environment.

14. The safety light in claim 13, wherein;
said electronic circuit further includes a delay circuit for providing continued activation of the conductance means for a predetermined period of time after both low ambient light levels are detected and said pressure switch no longer detects deformation of the tire.

15. The safety light in claim 13, wherein;
said pressure switch is defined by a two-state normally open switch;
said electronic circuit further includes a delay circuit;
said delay circuit having a means to activate the conductance means for a predetermined period of time after both low ambient light levels are detected and said pressure switch has changed state because of deformation of the tire;
said delay circuit providing deactivation of the conductance means independent of whether the two-state pressure switch is conducting or nonconducting.

16. The safety light in claim 13, wherein;
said pressure switch is defined by a strain sensor and a strain gauge circuit;
said strain gauge circuit having a means for activating the conductance means for a predetermined period of time after both low ambient light level is detected and said strain gauge circuit has detected a predetermined rate-of change in strain in the strain sensor because of deformation of the tire.

17. The safety light in claim 1, wherein;
said deformation-activated switch is defined by a two-sate normally open switch.

18. The safety light in claim 13, wherein;
said pressure switch is defined by a two-state normally open switch.

* * * * *